US012766915B2

(12) United States Patent
Kuo et al.

(10) Patent No.: US 12,766,915 B2
(45) Date of Patent: Oct. 20, 2026

(54) AUTOFILL OVERFILL PROTECTION TEMPERATURE SENSING AIR CONDITIONING REFRIGERANT RECHARGE

(71) Applicant: Pacific Link, L.L.C., Richardson, TX (US)

(72) Inventors: Alexander M. Kuo, Dallas, TX (US); Vincent F. Carrubba, Baldwin, NY (US)

(73) Assignee: Pacific Link, L.L.C., Richardson, TX (US)

( * ) Notice: Subject to any disclaimer, the term of this patent is extended or adjusted under 35 U.S.C. 154(b) by 98 days.

(21) Appl. No.: 18/809,654

(22) Filed: Aug. 20, 2024

(65) Prior Publication Data

US 2026/0054542 A1 Feb. 26, 2026

(51) Int. Cl.
*B60H 1/00* (2006.01)
*F25B 49/00* (2006.01)

(52) U.S. Cl.
CPC ........ *B60H 1/00585* (2013.01); *F25B 49/005* (2013.01)

(58) Field of Classification Search
CPC ............ B60H 1/00585; B60H 1/00978; F25B 2700/04; F25B 49/005
See application file for complete search history.

(56) References Cited

U.S. PATENT DOCUMENTS

| | | | | |
|---|---|---|---|---|
| 5,231,841 A * | 8/1993 | McClelland | F25B 45/00 62/149 |
| 9,981,637 B2 * | 5/2018 | Kuo | B60S 5/00 |
| 2005/0262855 A1 * | 12/2005 | Hsieh | B60H 1/00585 62/149 |
| 2006/0101835 A1 * | 5/2006 | Meldahl | F25B 9/008 62/149 |
| 2018/0010832 A1 * | 1/2018 | Bonifaccino | F24F 11/83 |
| 2019/0009638 A1 * | 1/2019 | Bonifaccino | B60H 1/3211 |
| 2019/0168572 A1 * | 6/2019 | Kuo | B60H 1/00585 |
| 2021/0129622 A1 | 5/2021 | Kuo et al. | |
| 2023/0364970 A1 * | 11/2023 | Kuo | F25B 45/00 |

* cited by examiner

*Primary Examiner* — Lionel Nouketcha
(74) *Attorney, Agent, or Firm* — Leber IP Law; Faustino Lichauco

(57) ABSTRACT

A method for servicing a vehicle an air-conditioning system of a vehicle comprises initiating refrigerant filling into the vehicle air-conditioning system. The method also comprises, after initiating the refrigerant filling, tracking a variation in a rate-of-change of the output temperature of the vehicle air-conditioning system measured by a temperature sensor within a passenger compartment of the vehicle. The variation in the rate of change of the output temperature is processed to determine a stopping time for the refrigerant filling. The refrigerant filling is then ceased at the stopping time.

16 Claims, 16 Drawing Sheets

Δ≥°

Automatic Fill Logic Table (Need Charge)

| Time Sec. | Temp | ΔT | Δ T1 | ΔT2 | ΔT3 | Logic | Action |
|---|---|---|---|---|---|---|---|
| 0 | 98 | | | | | | Measure Vent Temp – Log Initial Temp (Initial) |
| 0 | 98 | | | | | Start Recharge | Start Recharge |
| 30 | 96 | -2 | | | | ΔT Indicates Drop in Temp | Auto off-Read Temp-Continue |
| 60 | 92 | -4 | -2 | | | ΔT<0, ΔT1<-2 | Auto off-Read Temp-Continue |
| 90 | 91 | -1 | -4 | -2 | | ΔT<0 or ΔT1<-2 or ΔT2<-2 | Auto off-Read Temp-Continue |
| 120 | 88 | -3 | -1 | -4 | -2 | ΔT<0 or ΔT1<-2 or ΔT2<-2 or ΔT3<-2 | Auto off-Read Temp-Continue |
| 150 | 86 | -2 | -3 | -1 | -4 | ΔT<0 or ΔT1<-2 or ΔT2<-2 or ΔT3<-2 | Auto off-Read Temp-Continue |
| 180 | 84 | -2 | -2 | -3 | -1 | ΔT<0 or ΔT1<-2 or ΔT2<-2 or ΔT3<-2 | Auto off-Read Temp-Continue |
| 210 | 80 | -4 | -2 | -2 | -3 | ΔT<0 or ΔT1<-2 or ΔT2<-2 or ΔT3<-2 | Auto off-Read Temp-Continue |
| 240 | 77 | -3 | -4 | -2 | -2 | ΔT<0 or ΔT1<-2 or ΔT2<-2 or ΔT3<-2 | Auto off-Read Temp-Continue |
| 270 | 73 | -4 | -3 | -4 | -2 | ΔT<0 or ΔT1<-2 or ΔT2<-2 or ΔT3<-2 | Auto off-Read Temp-Continue |
| 300 | 70 | -3 | -4 | -3 | -4 | ΔT<0 or ΔT1<-2 or ΔT2<-2 or ΔT3<-2 | Auto off-Read Temp-Continue |
| 330 | 71 | 1 | -3 | -4 | -3 | ΔT<0 or ΔT1<-2 or ΔT2<-2 or ΔT3<-2 | Auto off-Read Temp-Continue |
| 360 | 67 | -4 | 1 | -3 | -4 | ΔT<0 or ΔT1<-2 or ΔT2<-2 or ΔT3<-2 | Auto off-Read Temp-Continue – ΔT is -20°< Initial |
| 390 | 67 | 0 | -4 | 1 | -3 | ΔT<0 or ΔT1<-2 or ΔT2<-2 or ΔT3<-2 | Auto off-Read Temp-Continue |
| 420 | 63 | -4 | 0 | -4 | 1 | ΔT<0 or ΔT1<-2 or ΔT2<-2 or ΔT3<-2 | Auto off-Read Temp-Continue |
| 450 | 59 | -4 | -4 | 0 | -4 | ΔT<0 or ΔT1<-2 or ΔT2<-2 or ΔT3<-2 | Auto off-Read Temp-Continue |
| 480 | 59 | 0 | -4 | -4 | 0 | ΔT<0 or ΔT1<-2 or ΔT2<-2 or ΔT3<-2 | Auto off-Read Temp-Continue |
| 510 | 57 | -2 | 0 | -4 | -4 | ΔT<0 or ΔT1<-2 or ΔT2<-2 or ΔT3<-2 | Auto off-Read Temp-Continue |
| 540 | 56 | -1 | -2 | 0 | -4 | ΔT<0 or ΔT1<-2 or ΔT2<-2 or ΔT3<-2 | Auto off-Read Temp-Continue |
| 570 | 56 | 0 | -1 | -2 | 0 | ΔT≥0 and ΔT1≥-2 and ΔT≥-2 and ΔT≥-2 | Auto off-Recharge Complete |

FIG. 8A

Automatic Fill Logic Table (Normal)

| Time | Temp | ΔT | Δ T1 | ΔT2 | ΔT3 | Logic | Action |
|---|---|---|---|---|---|---|---|
| 0 | 98 | | | | | | Measure Vent Temp - Log Initial Temp (Initial) |
| 0 | 96 | -2 | | | | ΔT Indicates Drop in Temp | Measure Vent Temp - Do Not Recharge |
| 0 | 92 | -4 | | | | ΔT Indicates Drop in Temp | Measure Vent Temp - Do Not Recharge |
| 0 | 88 | -4 | | | | ΔT Indicates Drop in Temp | Measure Vent Temp - Do Not Recharge |
| 0 | 84 | -4 | | | | ΔT Indicates Drop in Temp | Measure Vent Temp - Do Not Recharge |
| 0 | 80 | -4 | | | | ΔT Indicates Drop in Temp | Measure Vent Temp - Do Not Recharge |
| 0 | 74 | -6 | | | | ΔT Indicates Drop in Temp | Measure Vent Temp - Do Not Recharge |
| 0 | 71 | -3 | | | | ΔT Indicates Drop in Temp | Measure Vent Temp - Do Not Recharge |
| 0 | 69 | -2 | | | | ΔT Indicates Drop in Temp | Measure Vent Temp - Do Not Recharge |
| 0 | 67 | -2 | | | | ΔT Indicates Drop in Temp | Measure Vent Temp - T is at -20°< Initial. Normal System |

FIG. 8B

Automatic Fill Logic Table (Open)

| Time | Temp | ΔT | Δ T1 | ΔT2 | ΔT3 | Logic | Action |
|---|---|---|---|---|---|---|---|
| 0 | 98 | | | | | | Measure Vent Temp – Log Initial Temp (Initial) |
| 0 | 98 | | | | | Start Recharge | Start Recharge |
| 30 | 96 | -2 | | | | ΔT Indicates Drop in Temp | Auto off-Read Temp-Continue |
| 60 | 92 | -4 | -2 | | | ΔT<0, ΔT1<-2 | Auto off-Read Temp-Continue |
| 90 | 91 | -1 | -4 | -2 | | ΔT<0 or ΔT1<-2 or ΔT2<-2 | Auto off-Read Temp-Continue |
| 120 | 92 | 1 | -1 | -4 | -2 | ΔT<0 or ΔT1≥-2 or ΔT2<-2 or ΔT3<-2 | Auto off-Read Temp-Continue |
| 150 | 93 | 1 | 1 | -1 | -4 | ΔT<0 or ΔT1<-2 or ΔT2<-2 or ΔT3<-2 | Auto off-Read Temp-Continue |
| 180 | 94 | 1 | 1 | 1 | -1 | ΔT≥0 and ΔT1≥-2 and ΔT≥-2 and ΔT≥-2 | Auto off-Recharge Complete - T is -20°> Initial - Seek Service |

FIG. 8C

AUTOFILL OVERFILL PROTECTION TEMPERATURE SENSING AIR CONDITIONING REFRIGERANT RECHARGE

FIELD OF THE INVENTION

The system, apparatus and methods disclosed herein relate to an air conditioning (A/C) refrigerant recharge system inclusive of dynamic temperature change sensing and overfill protection for use in mobile A/C systems inclusive of automobiles, light trucks, recreational vehicles and travel trailers with both engine driven and electronic air conditioning compressors.

BACKGROUND OF THE INVENTION

Automotive air conditioning systems typically include three main components: (1) a compressor, (2) a condenser, and (3) an evaporator. A compressor is a pump driven by a belt attached to the engine's crankshaft and/or an electric pump with a discrete power source. In a multi-compressor system such as an RV both types of compressors may be present. Refrigerant is drawn into the compressor in a low-pressure gaseous form. As refrigerant is drawn in, the pump pressurizing the gas, increasing temperature and absorbing latent heat. From the compressor, compressed gas moved into the condenser on the high-pressure side of the air conditioning system. The condenser circulates a refrigerant condensate through a series of tubes in the path of a blower. Air moving across the tubes causes the refrigerant to further condense and to absorb latent. Consistent with the 2nd Law of Thermodynamics, thermal energy flows moves from hot to cold. Accordingly, in the third component of the system, the condensed, high temperature gas, moves through an expansion valve and into the evaporator. In this phase change system, the evaporator allows the refrigerant condensate to expand very quickly, increasing volume, reducing pressure, and to our purpose, reducing temperature consistent with the ideal gas law. Rapidly cooling gas then enters the evaporator coils in the path of a second blower or fan. Expanded gas cools the evaporator coils cool and, in turn, the adjacent air as it enters the air conditioned cabin.

In such an air conditioning systems, the efficiency of cooling during the compression and expansion cycles of a gaseous refrigerant varies with the level of refrigerant present in the system. For numerous reasons, refrigerant may slowly leak from the air conditioning system. As such, an automobile air conditioning system may require routine monitoring of the refrigerant level and the ability to sustain a pressure differential between the high and low sides of the system. The gradual loss of refrigerant is especially common to older vehicles with mechanical hose fittings. As of 2022, there were over 283 million registered vehicles in the United States. Nearly 70% of vehicles on the road today are six years or older representing approximately 198 million vehicles nationwide that are outside of their manufacturer warranties and are in possible need of a recurrent recharging of their air conditioning systems at a time when worldwide temperatures are steadily increasing due to climate change caused by greenhouse gas emissions.

The efficiency of cooling of these air conditioning systems may also be affected by age and state of the system. Over time, air conditioning compressors age and lose compression ability due to aging seals on moving parts. This deterioration of seals allows for pressurized refrigerant to blow-by and reduces the amount of compression possible to levels below newer compressors in comparison. The reduced compression is directly responsible for reductions in A/C performance. Aging evaporators and condensers also reduce the cooling capacity of air conditioning systems. During the system's normal operation, the evaporator gets cold and warm outside air is pushed thru the evaporator to have its heat removed so that colder air would then enter the auto's passenger cabin. The outside air has varying degrees of humidity (water vapor) which condenses on the cold evaporator and drains out of the car as noticed by water dribble on the ground during hot and humid summer months. The evaporator is frequently bathed in moisture and dirty air which causes mold and a collection of debris which clogs the evaporator and reduces its cooling performance over time. Aging air conditioning compressors, evaporators and condensers may still function acceptably, however when compared to new factory systems, the cooling capacity may be lower.

To allow the recharge of refrigerant, automotive air conditioners generally provide a service or refrigerant port to introduce new refrigerant and to inspect for low side pressures. Although recharge and inspection may be performed by service professionals, a significant number of automobile owners prefer to perform this routine inspection and replenishment on their own vehicles, in part due to the monetary and time savings obtained. In addition, one method of recharging of automotive air conditioner refrigerant as is typically performed by service professionals involves the complete evacuation of the refrigerant, followed by recharging the air conditioner with a full charge of refrigerant according to vehicle service specifications. This method is both time consuming and expensive and also a source of the release of refrigerants into the atmosphere that add to greenhouse gas accumulations that affect climate change. Service professionals that do perform recycling of refrigerant to prevent release of refrigerant into the atmosphere are required to possess expensive recycling and evacuation equipment that requires training due to its difficulty of use.

SUMMARY OF THE INVENTION

While the inventions disclosed herein are susceptible to various modifications and alternative forms, specific embodiments are shown by way of examples in the figures and as described in detail below. It should be understood that the figures and detailed descriptions discussed herein are not intended to limit the invention to the particular forms disclosed. On the contrary, the intention is to cover all modifications, equivalents and alternatives falling within the spirit and scope of the present inventions as defined by the appended claims.

In general, methods and apparatus of the present invention apply sensors, computer and circuit devices, logic control modules, communications interfaces, and actuators to achieve individualized air conditioning recharge with overfill and underfill protection while detecting system failures that would otherwise cause insufficient cooling, filling of excess refrigerant when recharge is not required and leaks of refrigerant into the atmosphere. For example, automated filling according to methods, systems and apparatus of the invention disclosed herein prevent users from emptying an entire can of refrigerant into an air-conditioning system where the A/C system does not require a recharge or cannot accept or hold additional refrigerant. Leaks in the A/C system lines and couplings may expel refrigerant or fail to maintain sufficient pressure to allow for comfort in the air conditioned cabin. Automated filling can prevent the recharging of A/C systems with failed components, such as a broken compressor. Recharging according to the methods will also detect a system that is not in need of refrigerant thereby preventing the unnecessary recharging of refrigerant into the system.

Age of and condition of each A/C system also impact the cooling performance of vehicles. Many recharge parameters are typically based on recharging to peak performance or cooling of a new system and do not account for compressor, condenser or evaporator changes over time and how it impacts the cooling capacity of each individual system and often cause users to overfill or underfill the A/C system under recharge. Failure to adjust for system age and condition cause inaccurate refrigerant fill (too much or too little) resulting in decreased A/C system performance, unneeded stress on A/C components or outright failure of the A/C system.

Additionally, changes in A/C system technology, different A/C systems depending on vehicle make and model, state of A/C systems, geographic location and respective ambient temperature also confound a fully user-controlled recharging process. For example, higher ambient temperatures at lower altitude impact pressures on the low pressure side of an A/C system as well as vent temperatures in the vehicle when compared to cooler ambient temperatures at higher altitude differently. Such variations would otherwise require the user (if filling using a gauge or filling based on a static ambient temperature) to adjust his or her reading as the user recharges the A/C system with conventional recharging systems. As each vehicle ages, each vehicle becomes more unique and realizing peak cooling performance difficult. In such conditions, fully user-controlled recharging based on pressure or static temperature differentials typically cause users to overfill or underfill the A/C system under recharge. Failure to adjust for current ambient temperature and its related effect on the pressure readings causes inaccurate refrigerant fill (too much or too little) resulting in decreased A/C system performance, unneeded stress on A/C components or outright failure of the A/C system. Moreover, to these users, more refrigerant is typically deemed better also leading to overcharging. The typical user tendency to overfill an air conditioning system beyond is efficient fill capacity leads to a decrease in the effective cooling of the automobile.

Lastly, changes to refrigerant types stemming from new gas materials, regulatory changes or innovation in A/C technologies makes recharging using static pressures or temperatures difficult for users. Current methods in market are typically designed for use with singular refrigerant parameters. Pressures and temperature targets for use in recharging A/C systems for one refrigerant type may not be suitable for different refrigerants. Utilizing those methods in that scenario typically causes users also to overfill or underfill the A/C system thereby causing inaccurate refrigerant fill (too much or too little resulting in decreased A/C system performance, unneeded stress on A/C components or outright failure of the AC system.

In exemplary embodiments of the present invention the sensors, computer and circuit devices, logic control modules, communications interfaces, and actuators may include: a communications interface between a smartphone application and fill logic control modules; a remote mounted vent sensor; a smartphone application processing the fill logic, and a valve controller unit actuating a fill valve operable to automatically control refrigerant flow from a standard A/C refrigerant canister and automatically stops refrigerant flow. The interfaces among and between the components follow standard communication protocols enabled by smartphone application software or other device software to monitor and control refrigerant fill based on vent sensor information transmitted by the remote vent sensor mounted on an air conditioning vent within the A/C system under filling or recharging. Additionally, some embodiments may not require a smartphone application and processing of commands, fill logic and actions may be performed within the device or sensor itself.

An apparatus and method for measuring the proper amount of refrigerant for recharging or servicing a refrigerant system, such as an automobile refrigerant system, are disclosed. Automated and dynamic sensing and control of the method and apparatus described herein allow a non-professional to easily, safely, and accurately recharge an air conditioning system while ensuring that sufficient refrigerant has been filled, and not overfilled, regardless of age and condition of system, ambient temperature, atmospheric pressure and humidity, thereby maintaining the efficiency of the refrigerant system and for providing individualized peak performance to cool the inside of each automobile.

In a first aspect of the invention, there is a system for servicing a vehicle refrigerant system, the system comprising a vent sensor for measuring the temperature of air output at an air conditioning vent inside a vehicle; an autofill device for actuating and/or automatically stopping a refrigerant fill valve in fluid communication with the vehicle refrigerant system and a refrigerant source; and a portable computer device in communication with the vent sensor and the autofill device. In some embodiments, the portable computer device may be configured to receive vent sensor information from the vent sensor; determine from the vent sensor information the change in temperature from a first time interval to a second time interval and successive intervals after that; and, from the received temperature information, the change in temperature and an elapsed time at successive time intervals, actuate the refrigerant fill valve via the autofill device based on the received vent sensor information, thereby causing the recharging of the vehicle refrigerant system, automatically stopping recharge once complete while preventing overfilling, underfilling, and the discharge of refrigerant into a defective or leaking vehicle refrigerant system.

In further embodiments, the first aspect may include a vent sensor that is a wireless vent sensor, wherein the vent sensor transmits vent sensor information at periodic intervals via a wireless communications protocol. In other embodiments, the autofill device of the system may comprise a valve controller unit (VCU), a wireless receiver, and a refrigerant fill valve in communication with the valve controller unit. Some embodiments may transmit and receive vent sensor information in degrees Celsius, Fahrenheit, or as a digital value representing the temperature at the output vent of the vehicle refrigerant system.

In a second aspect, there is an autofill device for servicing a vehicle refrigerant system, the autofill device in fluid communication with the vehicle refrigerant system and a refrigerant source. In one embodiment, the autofill device may comprise a refrigerant fill valve; and a valve controller unit (VCU) in communication with the refrigerant fill valve, wherein the valve controller unit receives fill valve actuating commands from a portable computer device, and wherein the autofill device is configured to: actuate the refrigerant fill valve based on the received actuation commands, thereby causing the recharging of the vehicle refrigerant system, automatically stopping recharge once complete while preventing overfilling, underfilling, and the discharge of refrigerant into a defective or leaking vehicle refrigerant system.

In some embodiments of the second aspect of the autofill device may comprise a valve controller unit (VCU) in communication with a portable computer device wherein the portable computer device receives vent sensor information from the vent sensor; determine from the vent sensor information the change in temperature from a first time interval to a second time interval and successive intervals after that; and, from the received temperature information, the change in temperature and an elapsed time at successive time intervals, actuate the refrigerant fill valve via the autofill device based on the received vent sensor information. The portable computer device may instruct the valve controller unit to automatically stop actuation of the refrigerant fill valve at predetermined time intervals to allow for the refrigerant previously filled to enter the air conditioning system, pressurize and cool the vent air for more accurate vent sensor information. This process may continue a multitude of occurrences until completion of recharge at which point the portable computer device will instruct the valve controller unit to automatically stop actuation. In further embodiments, the portable computer device may instruct valve controller unit to continue actuation one final predetermined elapsed time following completion of recharge, thereby causing the recharging of the vehicle refrigerant system, automatically stopping recharge once complete while preventing overfilling, underfilling, and the discharge of refrigerant into a defective or leaking vehicle refrigerant system.

In some embodiments of the second aspect the autofill device may comprise a valve controller unit (VCU) having a Bluetooth low energy (BLE) wireless receiver. In further embodiments, the valve controller unit (VCU) may receive refrigerant fill actuating commands from a portable computer device via one-way wireless communications. In still further embodiments, the autofill device may further comprise: a valve controller unit (VCU) in communication with the refrigerant fill valve, wherein the actuating of the refrigerant fill valve by the portable computing device includes transmitting commands to the VCU for the opening and closing of the refrigerant fill valve. Another embodiment of the second aspect may include an option to toggle between automatic and manual recharge allowing for more experienced users or professionals to control the recharge process, flow of refrigerant and determining when to stop recharge process.

In a third aspect, there is a portable computer device for servicing a vehicle refrigerant system, the portable computer device comprising: a processor and a memory configured to store data and instructions for execution by the processor, the instructions when executed by the processor configured to cause the processor to: receive vent sensor information from a vent sensor transmitting vent sensor information at an output vent of an air conditioning system inside the passenger compartment of a vehicle; determine from the vent sensor information the change in temperature from a first time interval to a second time interval and successive intervals; and, from the received temperature information, the change in temperature and an elapsed time at successive time intervals, actuate the refrigerant fill valve via the autofill device based on the received vent sensor information, thereby causing the recharging of the vehicle refrigerant system, automatically stopping recharge once complete while preventing overfilling, underfilling, and the discharge of refrigerant into a defective or leaking vehicle refrigerant system.

In further embodiments of the third aspect, the portable computer device may actuate of the refrigerant fill valve via the autofill device wherein the actuating is based on a threshold change in temperature at sample time intervals. In still further embodiments, the portable computer device may automatically stop actuating of the refrigerant fill valve via the autofill device based on detection of a decrease in change in temperature at one or more sample time intervals. In these and other embodiments, the portable computer device may base the actuating of the refrigerant fill valve via the autofill device on the detection of a change in temperature. In some embodiments, the portable computer device may further comprise instructions configured to detect and prevent overfilling, underfilling, and the discharge of refrigerant into a defective or leaking vehicle refrigerant system comprise instructions to detect insufficient or a reversal of cooling during a refrigerant fill process based on the received temperature information.

In another embodiment of the third aspect, the portable computer device is contained within the vent sensor itself. The vent sensor would display instructions visually through lights or audibly through sounds to a user actuating refrigerant filling based on the received visual or audio vent sensor information, thereby causing the recharging of vehicle refrigerant system, stop recharging once complete while preventing overfilling, underfilling, and the discharge of refrigerant into a defective or leaking vehicle refrigerant system.

In a fourth aspect, there is a computer-implemented method for servicing a vehicle refrigerant system, the method comprising: receiving vent sensor information from a vent sensor transmitting vent sensor information at an output vent of an air conditioning system; determining from the vent sensor information the change in temperature from a first time interval to a second time interval and successive intervals; and, from the received temperature information, the change in temperature and an elapsed time at successive time intervals, actuating refrigerant filling based on the received vent sensor information, thereby causing the recharging of vehicle refrigerant system, automatically stop recharging once complete while preventing overfilling, underfilling, and the discharge of refrigerant into a defective or leaking vehicle refrigerant system.

Embodiments of the fourth aspect may include steps for actuating the filling of refrigerant is based on a threshold change in temperature at sample time intervals, automatically stopping actuation of filling of refrigerant based on detection of a decrease in change in temperature at one or more sample time intervals, and/or steps for preventing the overfilling, underfilling, and the discharge of refrigerant into a defective or leaking vehicle refrigerant system based on the change in temperature indicating insufficient cooling or a reversal of cooling during a refrigerant fill process. In further embodiments of the fourth aspect, the computer implemented method may comprise instructions configured to detect and prevent overfilling, underfilling, and the discharge of refrigerant into a defective or leaking vehicle refrigerant system comprise instructions to detect insufficient or a reversal of cooling during a refrigerant fill process based on the received temperature information.

In a fifth aspect, there is a computer-implemented method for servicing a vehicle refrigerant system, the method comprising: receiving information from a vent sensor transmitting vent sensor information at an output vent of an air conditioning system inside the passenger compartment of a vehicle; determining from the vent sensor information the rate of change in cooling from the first time interval to successive time interval. If we were to map the cooling performance or drop in output vent temperature of an automotive air conditioning system during recharge of the system, you will find an inverted bell curve. If the system were empty or void of any refrigerant, the output vent temperature would be close or higher than the ambient temperature or automotive cabin air temperature. Once recharge has started and enough refrigerant has been added to achieve a high pressure state and a low pressure state in the system, the output vent air temperature will start to drop. As recharge is continuing, the output vent temperature will continue to drop until the system is full or fully recharged. The output air temperature will level out and cease to decrease noticeably once this occurs. If the system is continued to be charged once the system is full, overcharge starts to occur and the cooling performance of the system becomes impacted and vent temperature starts to increase. Additionally, if recharge continues after this, the system will cease to operate due to the dangerous amount of refrigerant added and the vent temperature will equalize back to ambient or cabin temperature. Determining from the rate of change information the peak cooling threshold of the system and actuating refrigerant filling based on the peak cooling threshold, thereby causing the recharging of vehicle refrigerant system, automatically stop recharging once complete while preventing overfilling, underfilling, and the discharge of refrigerant into a defective or leaking vehicle refrigerant system.

Embodiments of the fifth aspect may include determining of the peak cooling capacity of the system through the mapping of the rate of change information of the vehicle air conditioning system, actuating refrigerant filling through the rate of change information until the peak cooling capacity has been reached and automatically stop recharging once complete while preventing overfilling, underfilling, and the discharge of refrigerant into a defective or leaking vehicle refrigerant system. Additional embodiments of the fifth aspect may include actuating of additional refrigerant filling once peak cooling capacity has been reached in which the additional refrigerant is added based on predetermined elapsed time.

In a sixth aspect, there is an autofill device for servicing a vehicle refrigerant system, the autofill device in fluid communication with the vehicle refrigerant system and a refrigerant source, the autofill device comprising a refrigerant fill valve; a valve controller unit (VCU) in communication with the refrigerant fill valve; a processor and a memory configured to store instructions for execution by the processor, the instructions when executed by the processor configured to cause the processor to receive vent sensor information from a vent sensor transmitting vent sensor information at an output vent of an air conditioning system inside the passenger compartment of a vehicle, determine from the vent sensor information the change in temperature from a first time interval to a second time interval to successive time intervals and, from the received vent information, the change in temperature and an elapsed time at successive time intervals, then actuate the refrigerant fill valve via the valve controller unit based on the received vent sensor information, thereby causing the recharging of the vehicle refrigerant system while preventing overfilling, underfilling, and the discharge of refrigerant into a defective or leaking vehicle refrigerant system.

In other embodiments of the autofill device may further include instructions configured to actuate the refrigerant fill valve via the autofill device based on the received vent sensor information, comprise instructions to actuate the refrigerant fill valve based on the change in temperature at a current time interval to the change in temperature at a previous time interval. Still further, the autofill device may actuate the refrigerant fill valve via the autofill device based on a change in temperature at sample time intervals, and automatically stop charging when decreasing or no change in temperature at one or more sample time intervals, thereby preventing overfilling, underfilling, and the discharge of refrigerant into a defective or leaking vehicle refrigerant system by detecting insufficient cooling or a reversal of cooling during a refrigerant fill process based on the received temperature information.

In a seventh aspect of the invention, there is a system for servicing a vehicle refrigerant system, the system comprising a portable computer device contained within the vent sensor itself and an air flow conduit with portable computer device comprising: a processor and a memory configured to store data and instructions for execution by the processor, the instructions when executed by the processor configured to cause the processor to: receive vent sensor information from a vent sensor transmitting vent sensor information; determine from the vent sensor information the change in temperature from a first time interval to a second time interval and successive intervals; and, from the received temperature information, the change in temperature and an elapsed time at successive time intervals. Instruct user through display instructions visually through lights or audibly through sounds to a user actuating refrigerant filling thereby causing the recharging of the vehicle refrigerant system, stopping recharge once complete while preventing overfilling, underfilling, and the discharge of refrigerant into a defective or leaking vehicle refrigerant system. The vent sensor would be connected to an air flow conduit on one end with the other end of the air flow conduit attached to an output vent of an air conditioning system inside the passenger compartment of a vehicle. The conduit could allow for airflow from the output vent of an air conditioning system inside the passenger compartment of a vehicle to flow to vent sensor and the end of the conduit. The conduit would be moldable to lengthen and bend so that the vent sensor would be able to be positioned in a way visible by a user outside the vehicle near the engine compartment at the position of recharge so the user can receive commands displayed by the vent sensor without leaving the position of recharge.

These and other aspects and embodiments of the invention are further described below with reference to the following figures.

BRIEF DESCRIPTION OF THE DRAWINGS

FIG. 8A is table of inputs, outputs, times, ΔT values, fill logic and actions of an example of temperature changes and cooling during recharging, according to one embodiment of the air conditioning autofill overfill protection temperature sensing air conditioning refrigerant recharge device; FIG. 8B is table of inputs, outputs, times, ΔT values, fill logic and actions of an example of temperature cooling during recharging when a system is not in need of refrigerant.

FIG. 8C is a table of inputs, outputs, times, ΔT values, fill logic and actions of an example of temperature cooling during recharging when a system fault is detected part way through the filling operation.

A detailed description will now be given of the invention with reference to the above summarized drawings.

DETAILED DESCRIPTION

During operation, as the refilling or recharging of refrigerant proceeds under the control of the methods, apparatus and systems of the present invention, the device or smartphone device may display the reduction of the temperature at the air conditioning vent inside the vehicle denoting a rate of change, track and log changes in the vent temperature (ΔT) and automatically stop recharge to take vent temperature measurements at predetermined time intervals or upon reaching a predetermined ΔT threshold thereby determining peak cooling performance. Additionally, the smartphone or device may display instructions, controls, parameter settings, and error messages for user control and monitoring of the refrigerant filling. Methods and apparatus of the present invention may determine system integrity using (a) temperature, (b) time, (c) changes in temperature, under (d) the slowing or diminishing of the change in temperature value over a defined time interval. The system control logic that governs the introduction of a refrigerant into the A/C system may be comprised of Bluetooth or Bluetooth Low Energy radios where the wireless vent sensor broadcasts vent temperature readings to the device or a smartphone. The device or smartphone contains a digital instruction set to log the changes in temperature at preset time intervals. The device or smartphone takes data readings to determine the rate of change and instruct recharging. Once recharge has started, the device or smartphone is in communication with a valve controller unit that operates a valve plunger and automatically stops recharge at preset time intervals in to take additional temperature readings determining ΔT. Once the device or smartphone detects a slowing or no change in ΔT and ΔT derivatives denoting peak cooling has been reached, it instructs the valve controller unit to activate the valve plunger to automatically stop recharge. Throughout the recharge process from initialization to completion, the device or smartphone may display and instruct updates or user commands to control the recharge of refrigerant into the filling or low side service port of an air conditioning system.

vent sensor

Figure 1A:
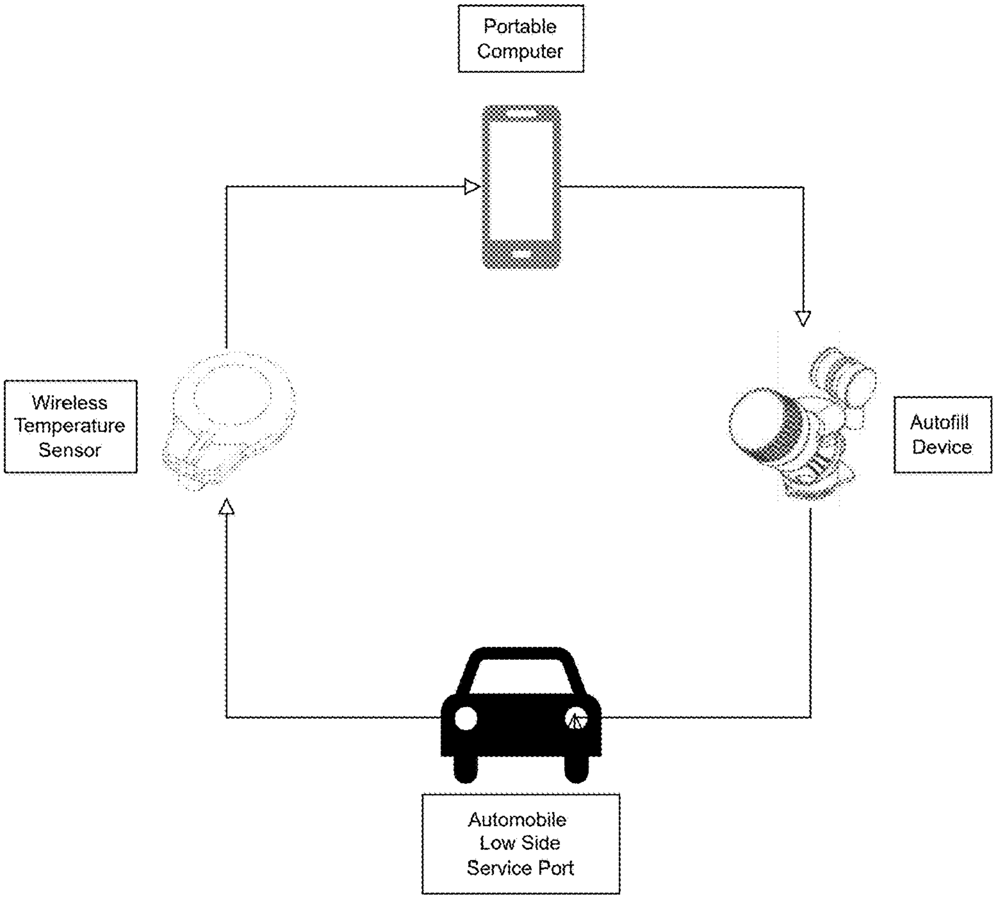
FIG. 1A and FIG. 1B depicts a system view of the air conditioning autofill overfill protection temperature sensing air conditioning refrigerant recharge device according to embodiments described herein.

FIG. 1A depicts a system view of the air conditioning autofill overfill protection temperature sensing air conditioning refrigerant recharge device according to embodiments described herein. As depicted in FIG. 1A, there is a vehicle having an air conditioning (A/C) system within (not shown) for which recharging of the A/C system is needed. The exemplary system includes a wireless vent sensor, a smartphone, and an autofill device, each as further described in detail below. The autofill device as shown is configured for attachment to a refrigerant bottle having a hose (not shown) for attachment to the fill port of the A/C system.

In the exemplary embodiment, the wireless vent sensor may be a thermocouple thermometer with wireless data communication capabilities, such as, but not limited to RFID, WiFi, IoT/5G, and Bluetooth standards, and broadcasts wirelessly in the vicinity of a vehicle A/C system under recharging. For longer battery life, the vent sensor may use the Bluetooth Low Energy (BLE) wireless communication standard for broadcasting vent sensor information to BLE-compatible receiver, however, any suitable wireless data communication standard may be employed. The vent sensor may include a clip that is configured to allow attachment to one or more air direction fins of the air conditioning vent in the interior of the vehicle being recharged. Such clips may be configured to hold the sensor securely in place on the air conditioning vent while a user is outside of the vehicle or making fill canister connections under the hood of the vehicle. Alternatively, wireless vent sensor may be substituted by a wired vent sensor without departing from the scope of some aspects of the invention described herein. In such alternative embodiments, the wired vent sensor may include an optional clip attachment to an air conditioning vent and/or a container for storage of the wired connection.

Figure 5A:
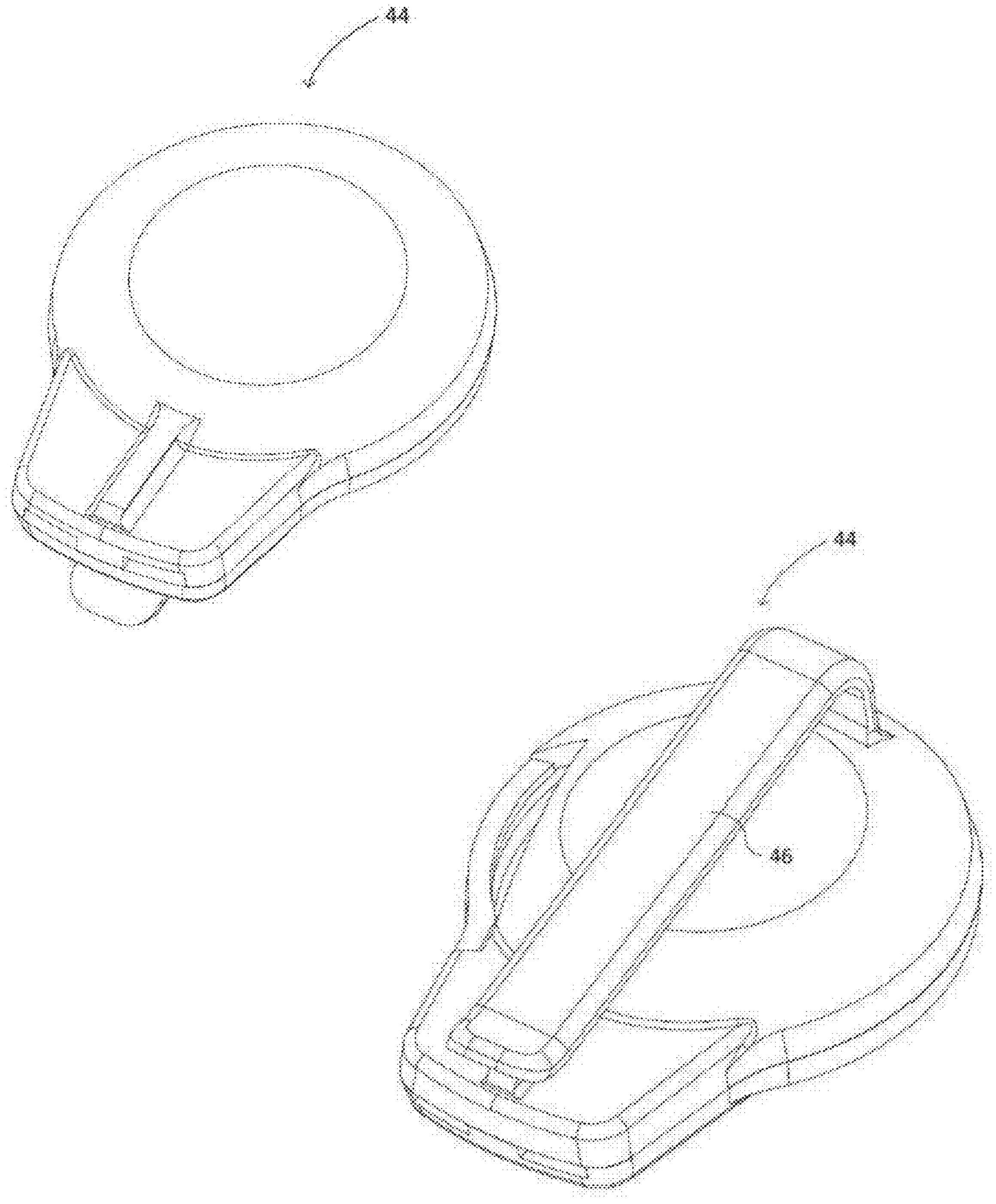
FIG. 5A shows front and back perspective views of a wireless vent sensor with clip as may be used in some embodiments of the invention.

The wireless vent sensor is preferably attached at an A/C output vent inside the vehicle. Typical vehicles have lower and upper air conditioning vents on both the driver and passenger sides in the front cabin of the vehicle. Additionally, air conditioning vents may be located near the front windshield for defrosting windows. In some vehicles, additional air conditioning vents are located in the rear cabin of the vehicle for passengers sitting in the rear seat. In the exemplary embodiment, the vent sensor (e.g., in the form of the wireless vent sensor 44 as shown in FIG. 1A and FIG. 5A) is used to measure the temperature of the air output from the upper air conditioning vent in the front cabin. It is noted that wireless vent sensor may also be used at a different air conditioning output vent in the vehicle without departing from the scope or operation of the invention as described herein.

Wireless vent sensor may optionally include an activation control, e.g. a button or switch, and/or a timer adapted for turning off the power of the vent sensor after a determined time period of activation, thereby conserving battery power. Additionally, wireless vent sensor may optionally include a visible extender, e.g. led lights or light strip, or audible sound further communicating with user. When activated, in some embodiments, temperature information is transmitted from the wireless vent sensor periodically by wireless communications. Temperature information may be received by a wireless receiver on a smartphone device or other device. Temperature information received from the smartphone device or other device may be recorded, displayed, analyzed, and used by a smartphone application operating on the smartphone device to instruct user and control recharging by the autofill device. In operation, when activated, wireless vent sensor may transmit, by wired or wireless communications as above, updates of the temperature information at an output air conditioning vent inside the vehicle. In various embodiments, wireless vent sensor may provide updates in real-time, at predetermined intervals, or upon request by the user or by an input control on the wireless vent sensor. Alternatively, in some embodiments, vent sensor may be polled by the smartphone device or other control device for an instantaneous reading of temperature at the air conditioning vent.

FIG. 1A further depicts a smartphone device in communication with the wireless vent sensor and further in communication with the valve control unit (VCU). Smartphone device as used herein includes any computer device, preferably a portable computer device, capable of configuration, programming, and operation according to the methods described herein. Such smartphones may include, but are not limited to, the Apple™ iPhone, Android-enabled smartphones and devices, Blackberry™ or other personal digital assistant devices, tablet PC's such as the Apple™ iPad, Samsung™ Galaxy Tab and other such devices as one of ordinary skill in the art would readily understand as equivalents. Such devices may include two-way communications via cellular network communications and/or an internet communications path via WiFi, WLAN, or other TCP/IP communications means for application software and data updates, or for the uploading or sharing of application data to the cloud.

Figure 1B:
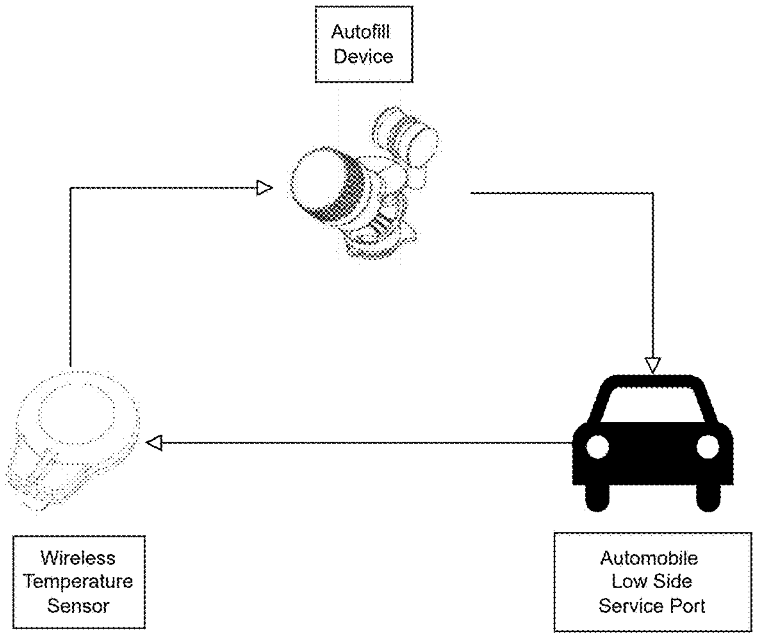

FIG. 1B depicts a system view of the air conditioning autofill overfill protection temperature sensing air conditioning refrigerant recharge device as depicted in FIG. 1A. As depicted in FIG. 1B, there is a vehicle having an air conditioning (A/C) system within (not shown) for which recharging of the A/C system is needed. The exemplary system includes a wireless vent sensor and an autofill device. The operation of the embodiment depicted in FIG. 1B is the same as the embodiments explained in FIG. 1A with the sole difference being the device itself would contain and house an internal printed circuit board (PCB) and take the place of the smartphone depicted in FIG. 1A. All other operations would remain the same.

Operation of the components of the exemplary system as shown in FIG. 1A and FIG. 1B are further described below with reference to a standard model of an evaporator cycle of a typical A/C system, the operation of which as would be understood to one skilled in the art as follows with reference to FIG. 2.

Figure 2:
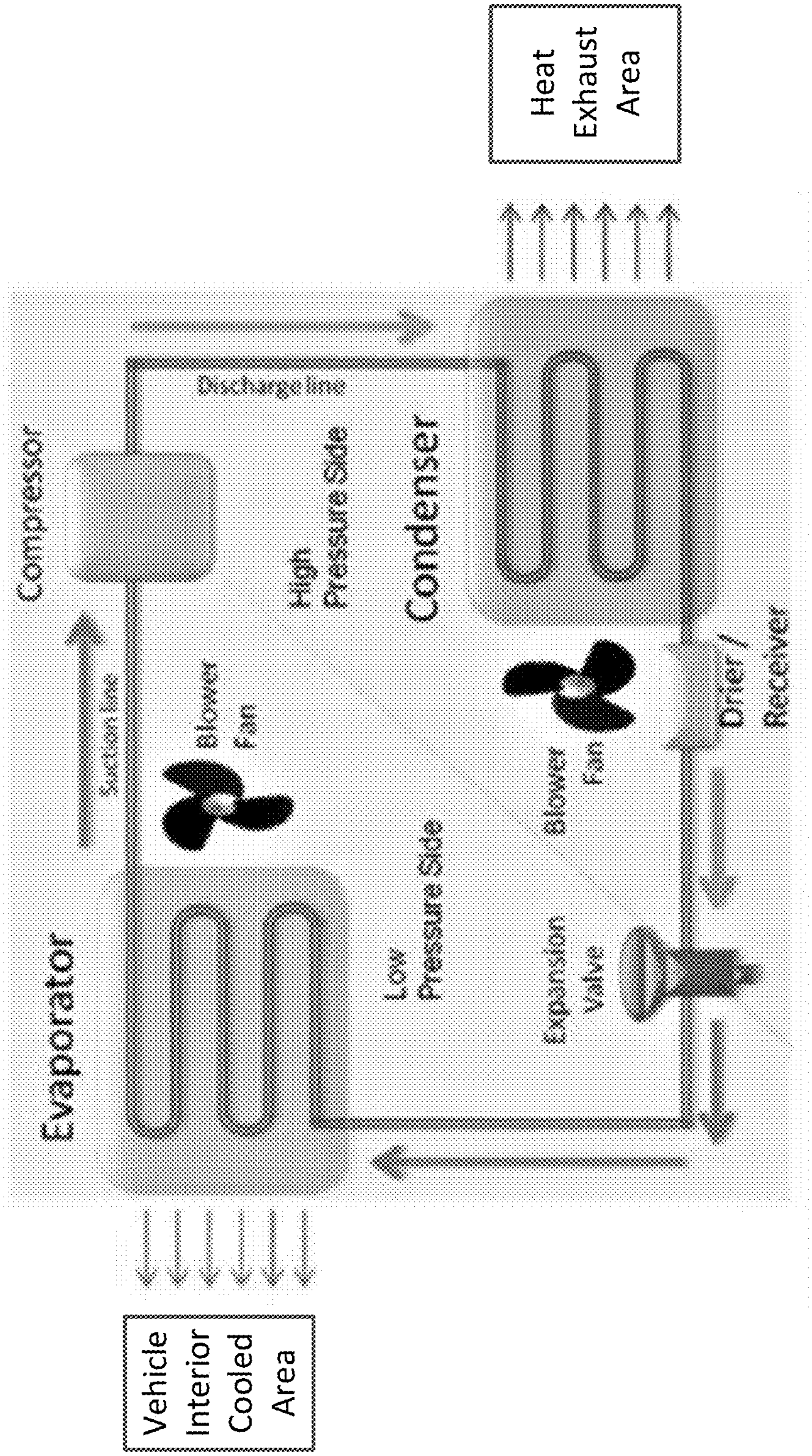
FIG. 2 depicts the evaporator cycle of a typical air conditioning system for application of the air conditioning autofill overfill protection temperature sensing air conditioning refrigerant recharge device described herein.

FIG. 2 depicts the evaporator cycle of a typical air conditioning system for application of the air conditioning autofill overfill protection temperature sensing air conditioning refrigerant recharge device described herein. The typical air conditioning system as shown in FIG. 2 comprises a low pressure side having an evaporator, a high pressure side having a condenser and a drier/receiver, and at the boundaries of the low and high pressure sides, an expansion valve and a compressor. The high and low pressure sides of the air conditioning system operate to provide thermal exchange between an environmentally contained "cooled" space and a heat discharge space. Such air conditioning systems may include a low pressure side blower fan for blowing air across the evaporator coil and a high pressure side blower fan for blowing air across the condenser coil evaporator to accelerate the thermal exchange between the environmentally contained space and the heat discharge space, respectively. Typically, the low pressure side includes a fill port (not shown) providing a bayonet/spring sealed connection to a fill fitting.

Within the coils of FIG. 2 is a refrigerant, typically 1,1,1,2-tetrafluoroethane (also known as R134a, Freon 134a, Forane 134a, Genetron 134a, Florasol 134a, Suva 134a, norflurane (INN), or HFC-134a). 1,1,1,2-Tetrafluoroethane or R134a is a non-flammable gas used primarily as a high-temperature refrigerant for domestic refrigeration and automobile air conditioners. R134a began use in the early 1990s as a replacement for the more environmentally harmful R12. R134a is a hydrofluorocarbon (HFC) and haloalkane refrigerant with thermodynamic properties similar to R12 (dichlorodifluoromethane) but with less ozone depletion potential and a lower 100-year global warming potential. Despite its lessor ozone depletion and lessor global warming potential, atmospheric concentrations of R134a refrigerants have been increasing. R134a contributions to radiative forcing has led to restrictions on its use and discharge. By 2030, for example, R134a will be banned from use in automotive air conditioning systems in the European Union, and in 2021 in the United States for newly manufactured light-duty vehicles. Transitions to refrigerants with lower carbon emissions or carbon equivalents have already occurred in the United States for newly manufactured vehicles utilizing the fluorochemical refrigerant HFO-1234yf 2,3,3,3-tetrafluoropropene, or R-1234yf. Additionally, research has begun on with using alternative refrigerants and refrigerant blends. Currently, the U.S. automotive market is still predominantly R134a due to the number of used cars in market, however, a shift to use of alternatives such as HFO-1234yf and other blends have started. With the focus on lowering carbon emissions and stricter regulations on the use of refrigerants, the efficiency and effectiveness of air conditioning systems calls for even more precision in their recharging.

Cycling the system shown in FIG. 2 by the compressor sets up a high to low pressure, high to low temperature exchange that captures excess heat in a liquid phase refrigerant and rapidly expands the refrigerant on the low pressure side, lowering the refrigerant temperature through the evaporator coil. Latent heat fusion condenses the refrigerant to capture heat from an environmentally contained space and the condenser blow fan discharges heat into the heat discharge space. Beginning the cycle, the compressor compresses refrigerant drawn from the low pressure side suction line into the high pressure side discharge line of the coil. At the output of the condenser the drier/receiver serves as temporary storage for refrigerant during periods of low cooling demand and may contain a desiccant for reduction of moisture within the coil. High pressure refrigerant exits through the expansion valve into the low pressure side thus cooling the low pressure side coil. The low pressure side blower fan blows air across the evaporator coil into the environmentally contained space to complete the cycle.

To properly cool the air as it is blown through the evaporator coil, the high side pressure and the low side pressure differential must be sufficient enough to cause the desired cooling effect. If there is too little refrigerant in the A/C system, then the high side pressure is insufficiently high and thus the differential between the high side pressure and low side pressure is not sufficient to create a cooling effect. If there is too much refrigerant, the high side pressure is over charged and the low side pressure becomes relatively too high as well. That is, where the differential between the high pressure and low pressure is not sufficiently high, the low side pressure increases as well resulting in the compressor pumping liquid refrigerant, not in gas form, through the evaporator coil and causing possible damage to A/C system components.

One skilled in the art would understand that the physical integrity of the liquid-to-vapor phase change cycle maintains the refrigerant in the system. If the physical integrity of the air conditioning system is compromised the refrigerant will leak out and the pressure differential between the high and low side cannot be maintained. When the integrity of the system is comprised, the cooling capacity of the system is lost and thus the A/C system's ability to control temperature in the environmentally contained space is compromised. The loss of system integrity is environmentally unfavorable as all refrigerants are considered a greenhouse gas in the upper atmosphere contributing to retention of heat in the Earth's climate with corresponding impacts to global warning. One skilled in the art would understand that excess charging of an A/C system not only results in failure or poor performance of the A/C system, excess charging wastes a greenhouse-gas contributing refrigerant that will eventually find its way to the upper atmosphere.

Figure 3:
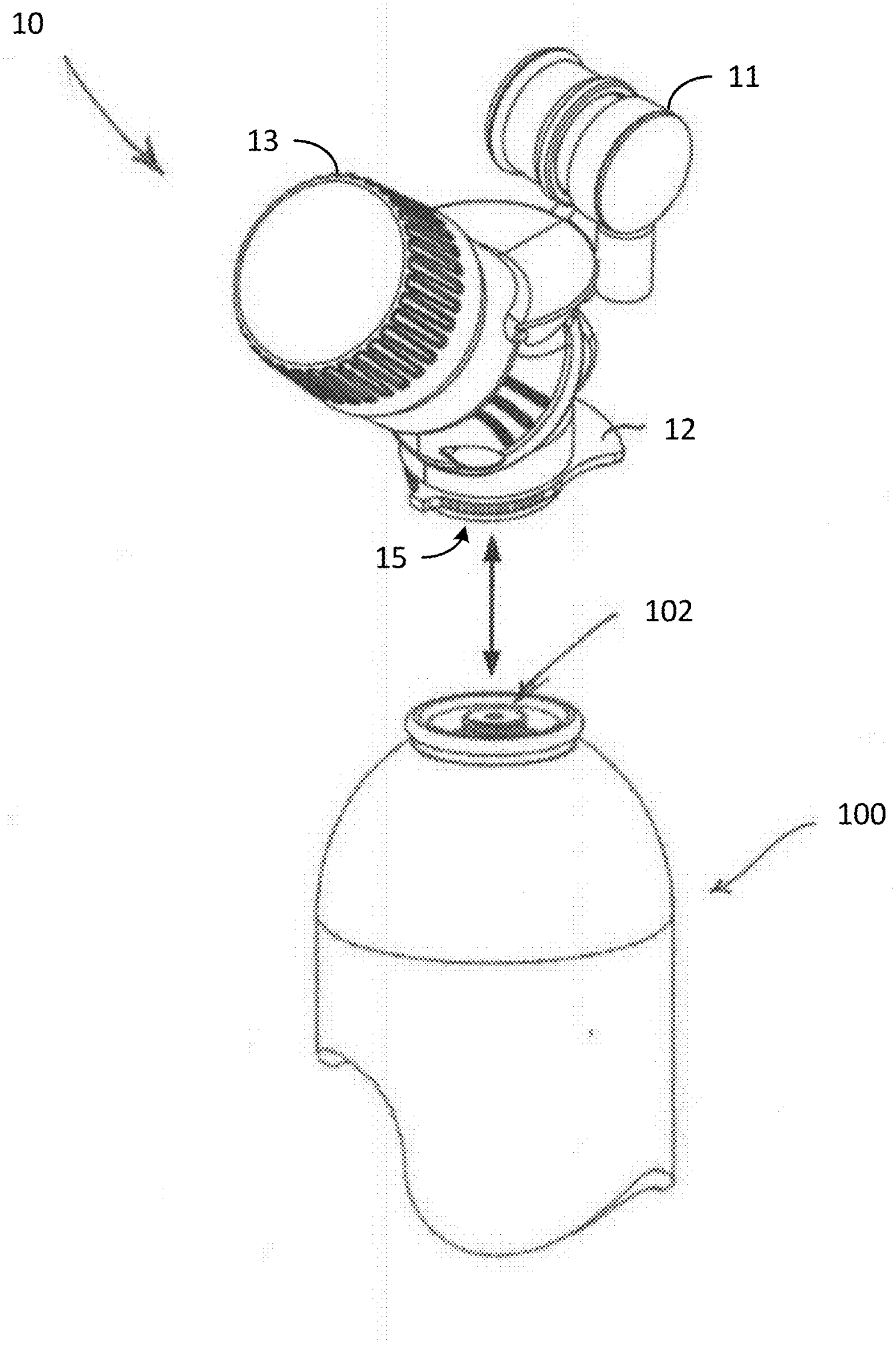
FIG. 3 depicts an exemplary air conditioning refrigerant bottle and autofill device for engagement with the air conditioning refrigerant bottle for use with some embodiments of the invention.

FIG. 3 depicts an exemplary autofill device 10 for engagement with an air conditioning refrigerant bottle 100 according to some embodiments of the invention. As shown in FIG. 3, the autofill device 10 is configured for threaded attachment to a standardize, pressurized refrigerant canister 100, and includes an attachment portion 15 that is adapted to allow easy removal of the autofill device from the canister. Canister connector 12 may be adapted for attachment to attachment portion 15 for use in shipping so as the refrigerant can is not accidentally open during shipping, storage and sale because the attachment portion 12, once screwed on to refrigerant canister, it opens the port of the refrigerant canister. Autofill device also includes a quick detach coupler 11 for attaching to a vehicle air conditioning port and top cap assembly 13. The autofill device includes an actuation device, such that when the autofill device is actuated to an open position, refrigerant flows from the refrigerant bottle into the A/C system, thereby refilling or recharging the refrigerant system.

Figure 4A:
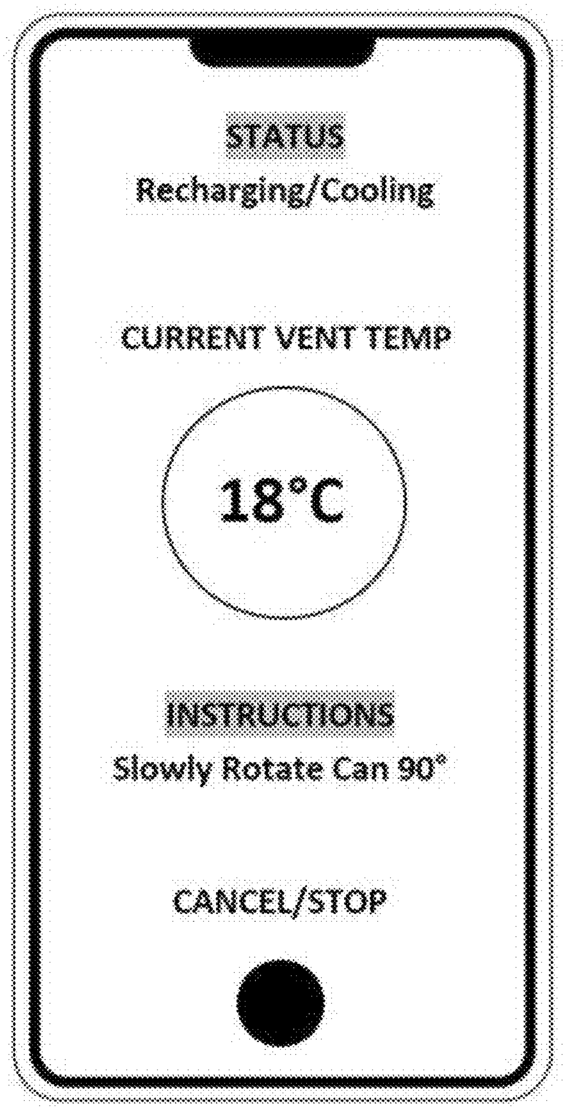
FIG. 4A depicts a user interface of the smartphone app device according to one embodiment of the invention.

FIG. 4A depicts an exemplary user interface of the smartphone app device according to some embodiments of the invention. As shown, the smartphone app device may present to the user the current sampled temperature at the output vent of the air conditioning system as measured by the vent sensor. Current temperature may be displayed in Celsius or Fahrenheit according to user settings. Control of the recharging process may be provided by user buttons, menu options, or other control elements, including a Cancel/Stop control to cause refilling to end. Status messages may include, but are not limited, to:

System initializing
Ambient within normal fill temperature range
Initialization complete
Start Recharge
Refrigerant fill in process
Measuring Vent Temp
Start Recharge
Refrigerant fill in process
Measuring Vent Temp
Start Recharge
Measuring Vent Temp
Refrigerant fill complete Vent temp reduced
A/C performance stable Status messages may include instructions to the user such as:

Please disconnect the fill hose coupling from the refrigerant inlet connector
Please reclaim the temp sensor from the A/C vent and turn off.
Congratulations! A/C project complete!

The user interface may include status messages for input of feedback from the user such as "Please rate your fill rate experience: ☆☆☆☆☆"

Figure 4B:
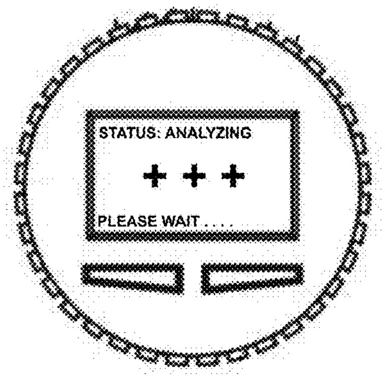
FIG. 4B depicts a user interface of device display according to an alternative embodiment of the invention.

FIG. 4B depicts an exemplary user interface of the device display according to alternative embodiments of the invention. As shown, the display may present to the user the status of the system and instructions to the user during the recharge process. The display may instruct the user when to start recharge process, stop recharge, inform the user of analysis, continue recharge and when to stop recharge when complete. The display may also inform user if a healthy system is detected or a system fault is detected instructing user to seek further service.

Figure 5B:
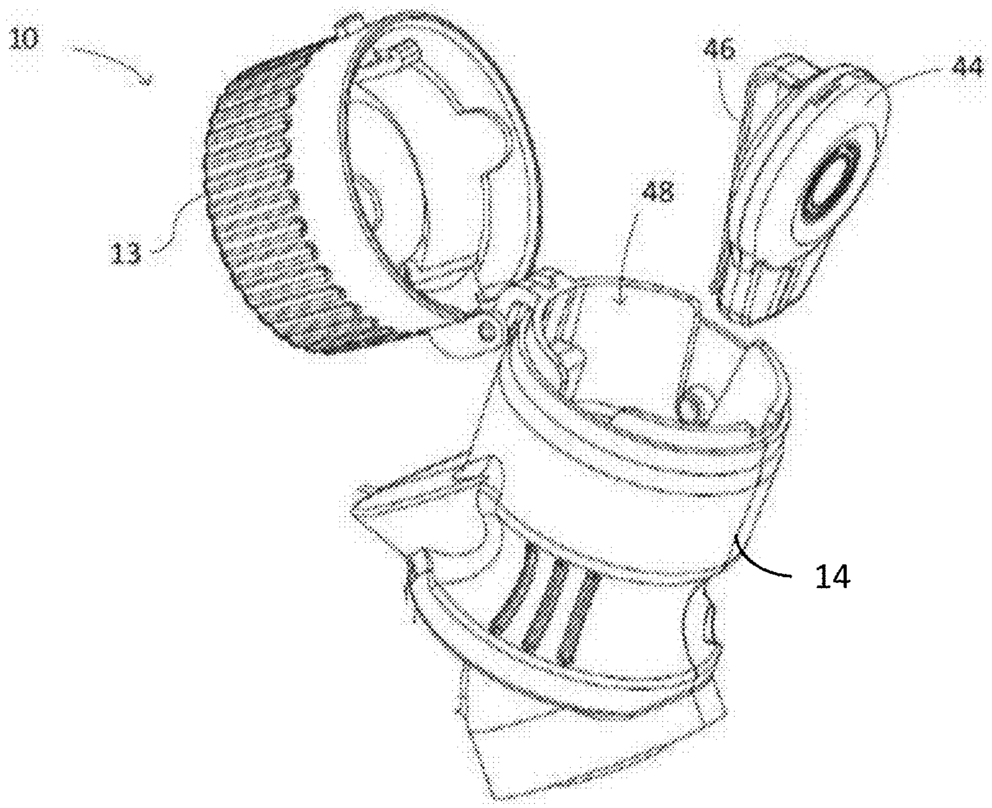
FIG. 5B is a perspective view according to an alternate embodiment having a hinged housing defining a cavity, and includes a wireless sensor stored in the cavity and a display on the face of the housing.

FIG. 5A depict views of a vent sensor 44 suitable for use with the autofill system. Vent sensor 44 has wireless data communication capabilities, such as but not limited to RFID, WiFi, IoT/5G, and Bluetooth standards, and communicates with the temperature measurement device 10 wirelessly. Vent sensor 44 may include a clip 46 configured to allow the vent sensor to be easily attached to an air conditioning vent in the interior of the vehicle being serviced. Additionally, vent sensor may include LED Lights (not pictured) or Audible Sounds (not pictured) for communication with user. In some embodiments, as shown in FIG. 5B, the autofill device housing 14 is configured with a flip-up lid 13 for providing access to compartment 48 in which may be stored the wireless vent sensor 44.

Figure 5C:
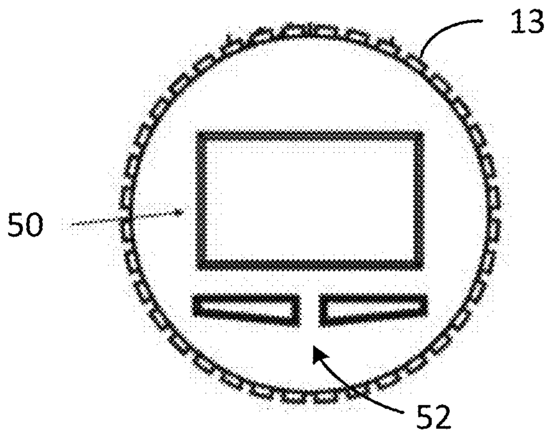
FIG. 5C depicts an alternative embodiment providing display and control button capabilities for user display and control during operation of the autofill device.

In a further alternative embodiment shown in FIG. 5C, lid 13 may include display and user input components, including an LCD display 50, control buttons 52, and a printed circuit board (pcb) (not shown) housed within the flip-up lid. Printed circuit board may include a processor and a memory for storing data and instructions for performing operations and displays based on temperature and other data obtained by temperature measurement device 10. Instructions performed by the processor may be configured to implement the logic controller functions as described below, as an alternative to the smartphone hosted application described above. For example, the printed circuit board may be configured to control refrigerant filling via the VCU (not pictured) by implementing the fill logic discussed in detail below. The printed circuit board, in some embodiments, may be integrated with, or integrate the functions of the VCU as described herein. Display 50 may be configured to display messages to the user as with the examples given above in FIG. 4. Buttons 52 may be configured to interact with the printed circuit board to allow user control of information displayed on the display screen 50 and operations of the logic controller or VCU.

Figure 5D:
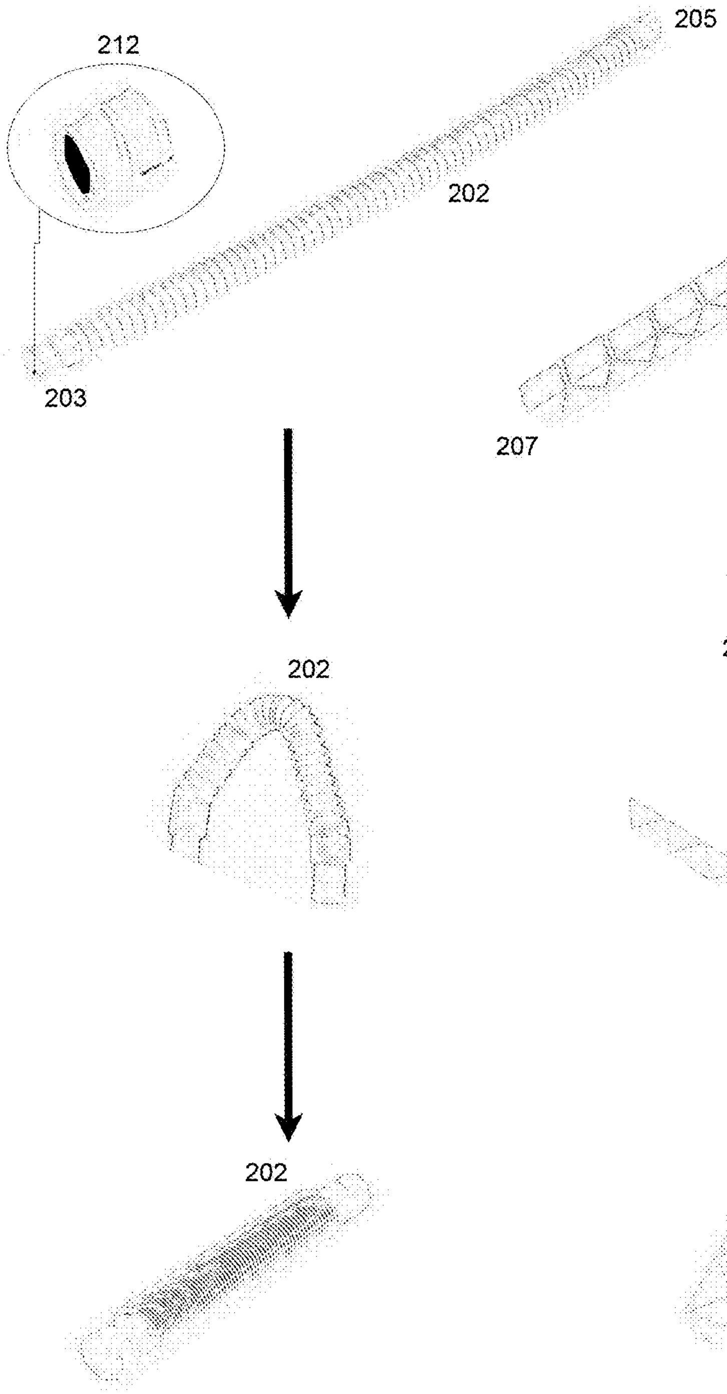
FIG. 5D shows an example of a pliable air flow conduit to be attached to an output vent of an air conditioning system inside the passenger compartment of a vehicle.
Figure 5E:
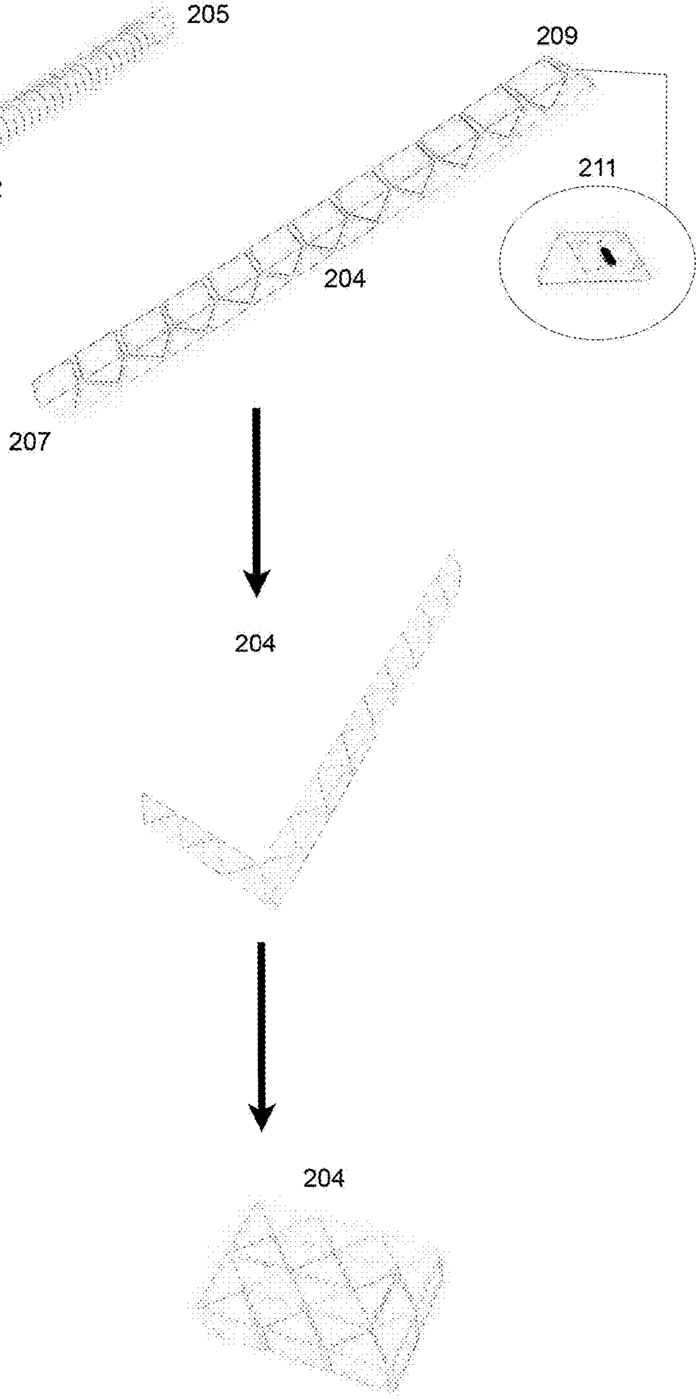
FIG. 5E shows an alternative embodiment of a pivoting air flow conduit to be attached to an output vent of an air conditioning system inside the passenger compartment of a vehicle.

FIGS. 5D and 5E show air-flow conduits 202, 204 that promote the ability to observe the output of a vent sensor 44 from outside the vehicle's passenger compartment.

In FIG. 5D, the air-flow conduit 202 extends between a first end 203 and a second end 205. The first end 203 attaches to an output vent (not shown) of an-conditioning system inside the vehicle's passenger compartment. The second end 205 couples to a vent sensor 44. An empty cavity 212 promotes air flow between the first end 203 and the second end 205 while maintaining rigidity.

In the embodiment of FIG. 5D, the air-flow conduit 202 is in the form of a pliable tubular hose that through an accordion-like bellows structure that can be flexed and expanded so that when the first end 203 is attached to the output vent of the vehicle's air conditioning system, the second end 205 can be moved to almost position within the length of the fully extended air-flow conduit.

As shown in FIG. 5D, the air-flow conduit 202 is shown in its fully extended state, in a somewhat extended but flexed or bent state and then in its fully compressed (non-extended) state. In this configuration, In the embodiment shown in FIG. 5E, the air-flow conduit 204 is in the form of an elongated series of interlocking channel elements 211 that extend between a first end 207 and a second end 209. The air-flow channel with its interlocking elements 211 provide an air-flow channel that can be pivoted in a variety of positions. For example, when the first end 207 is attached to an output vent of an-conditioning system inside the vehicle's passenger compartment and the second end 209 coupled to a vent sensor 44, the second end 209 can be positioned to many different positions by simply pivoting the conduit at selected connections between interlocking elements.

Each interlocking channel element 211 serves as a triagonal prism element and each is triangular in cross-section with an empty cavity 214 that promotes air flow between the first end 207 and the second end 209 while maintaining rigidity.

As shown in FIG. 5E, the air-flow conduit 204 is shown in its fully extended state, in a flexed or bent state and then in its fully compressed (non-extended) state. When air-flow conduit 204 is bent into an "L" shape, it is possible to change the direction of airflow such that the vent sensor 44 is above the dashboard, thus enabling it to be observed through the vehicle's windshield.

As can be seen from FIG. 5E, in the fully compressed state, air-flow conduit 204 can be advantageously folded into a compact and easily stored configuration.

In both of the configurations shown in FIGS. 5D and 5E, the conduit 202, 204 directs air to the vent sensor 44. This frees the vent sensor 44 from having to be proximate to the vent. As a result, the vent sensor 44 can be placed in a more convenient location for viewing from outside the vehicle.

Figure 5F:
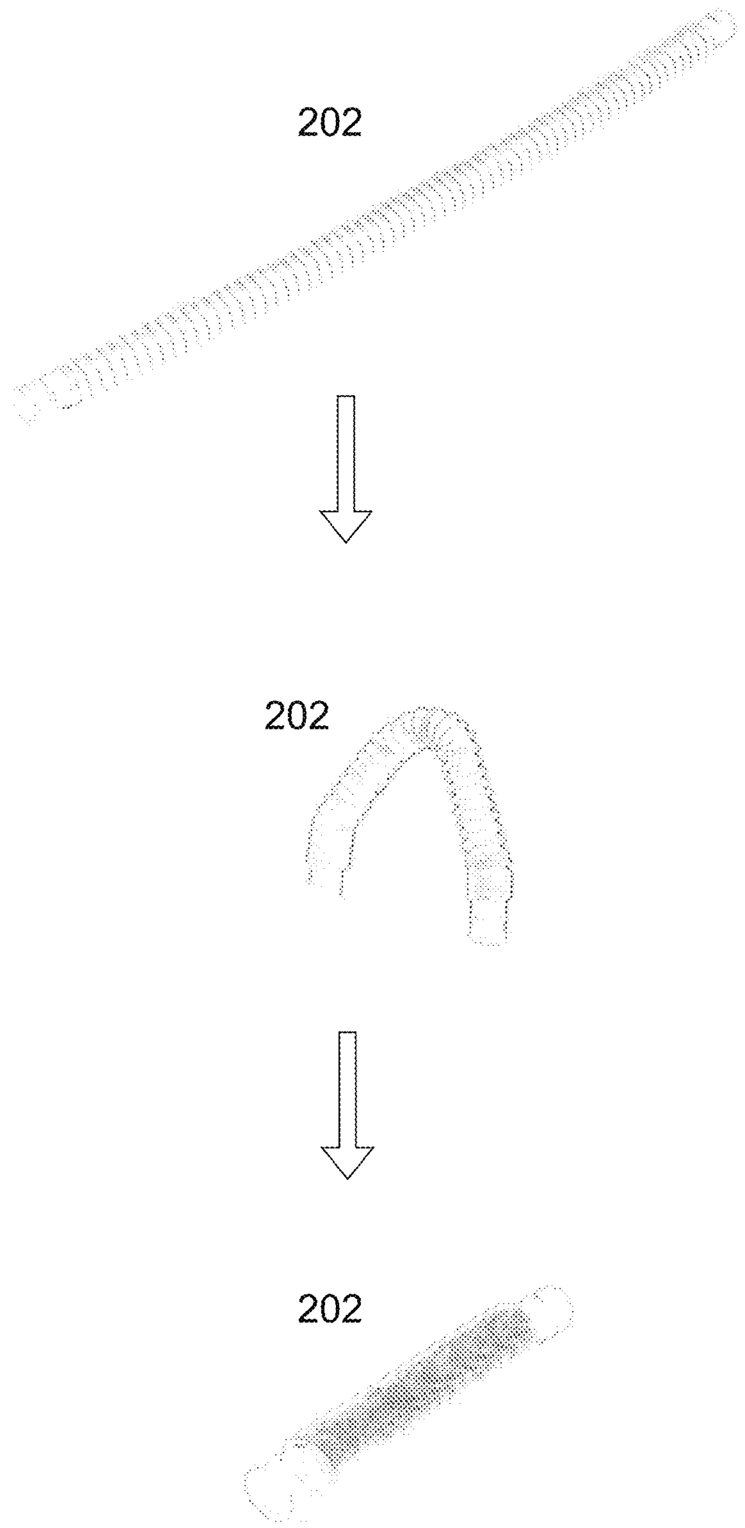
FIG. 5F is an embodiment showing different states of a pliable air flow conduit.

FIG. 5F shows a pliable conduit 202 incorporating longitudinally extending bellows. From top to bottom FIG. 5E shows the pliable conduit 202 in three configurations: a straight configuration, a bent configuration, and a storage configuration.

In the pliable conduit 202, the set of points at which the conduit can be bent forms a continuum. Storing the pliable conduit 202 requires only compressing the accordion-like bellows as shown in the bottom of FIG. 5F.

Figure 5G:
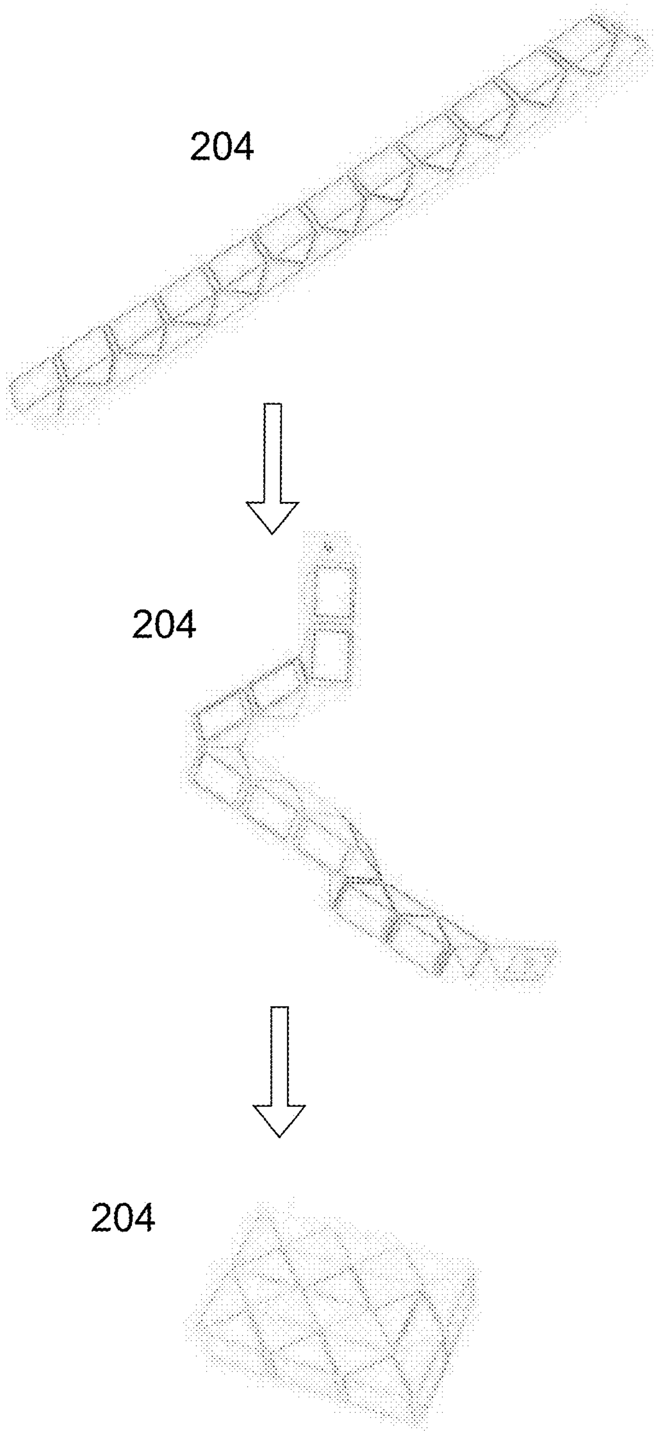
FIG. 5G is an alternative embodiment showing different states of a pivoting air flow conduit.

FIG. 5G shows a pivoting conduit 204 featuring segments linked by pivots. Each segment is a trigonal prism. From top to bottom FIG. 5F shows the pivoting conduit 204 in three configurations: a straight configuration, a bent configuration, and a storage configuration.

In the pivoting conduit 204, the set of points at which bending is possible is a finite set of discrete points, each of which corresponds to a pivot. As a result of symmetry, the segments fold to form squares. As a result, storing the pivoting conduit 204 requires pivoting the segments so that the segments interlock to form a square.

Figure 5H:
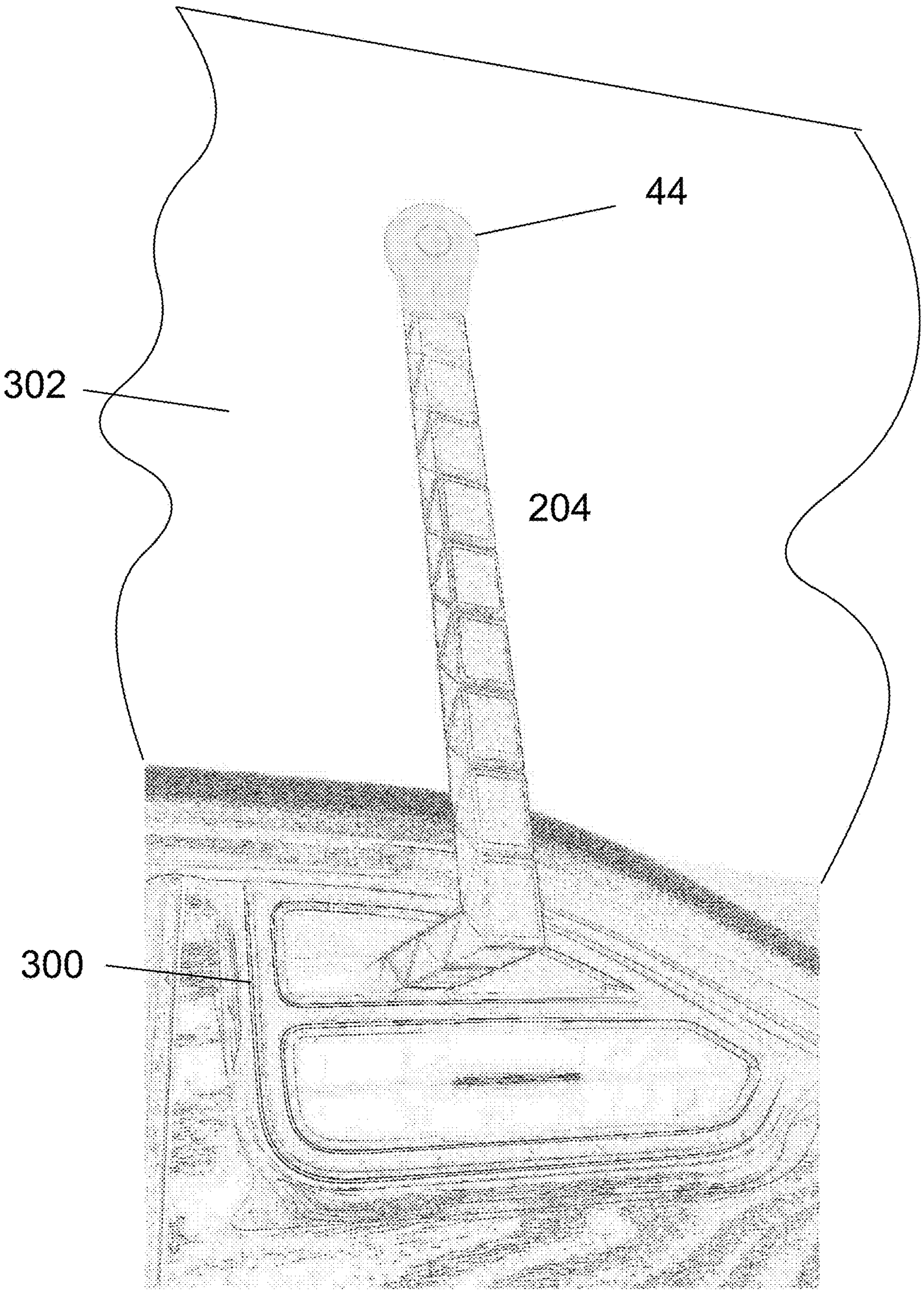
FIG. 5H depicts a perspective view of a air conditioning output vent inside the passenger compartment with a pivoting air flow conduit attached and bent.

FIG. 5H shows a traditional air conditioning output vent 300 inside the passenger compartment of a vehicle with a pivoting conduit 204 attached at one end and a vent sensor 44 attached at the other. The pivoting conduit utilizing the interlocking channel element 211 are bent and arranged in an "L" shape to allow airflow to be manipulated so that the vent sensor 44 may be positioned in a way that is visible from outside the vehicle while receiving cooled air. Air flow from the output vent 300 would pass through an empty cavity 211 to allow the cooled air to be detected by vent sensor 44, which, in this embodiment, is positioned to be viewed by a user through the windshield 302 of the vehicle.

Figure 6A:
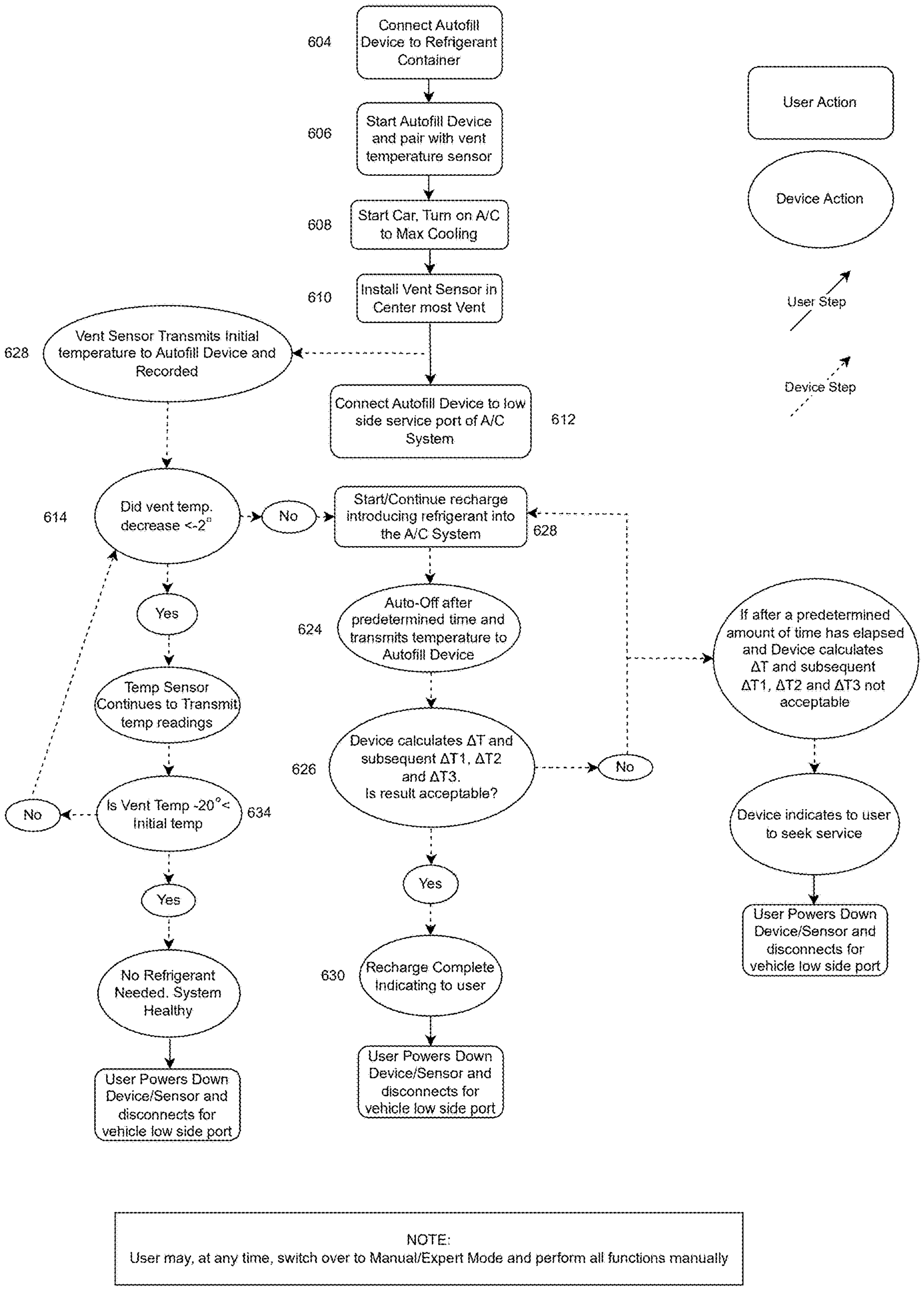
FIGS. 6A, 6B, and 6C depict a process of auto-filling under the control of the smartphone app and conditional logic controller in communication with the autofill device.

FIG. 6A depicts the process of the autofill device logic. Autofill Device is connected to the refrigerant source (604). Autofill device is turned on and paired with vent sensor (and smartphone app if applicable) (606). User to start vehicle, turn on AC to max vent speed and recirculation (608). Vent sensor is then installed in the center most vent (610). User then connects Autofill device to vehicle low side service port (612). Temperature information is received from the wireless vent sensor by the Autofill device as the initial temperature at the start of the fill operation (628). In a next time interval, sampled temperature information is again received from the wireless sensor by the device. The received vent sensor information is then compared to the initial temperature by the device to determine the change in temperature $\Delta T$ from the initial sample interval to the current sample interval (614).

Figure 6B:
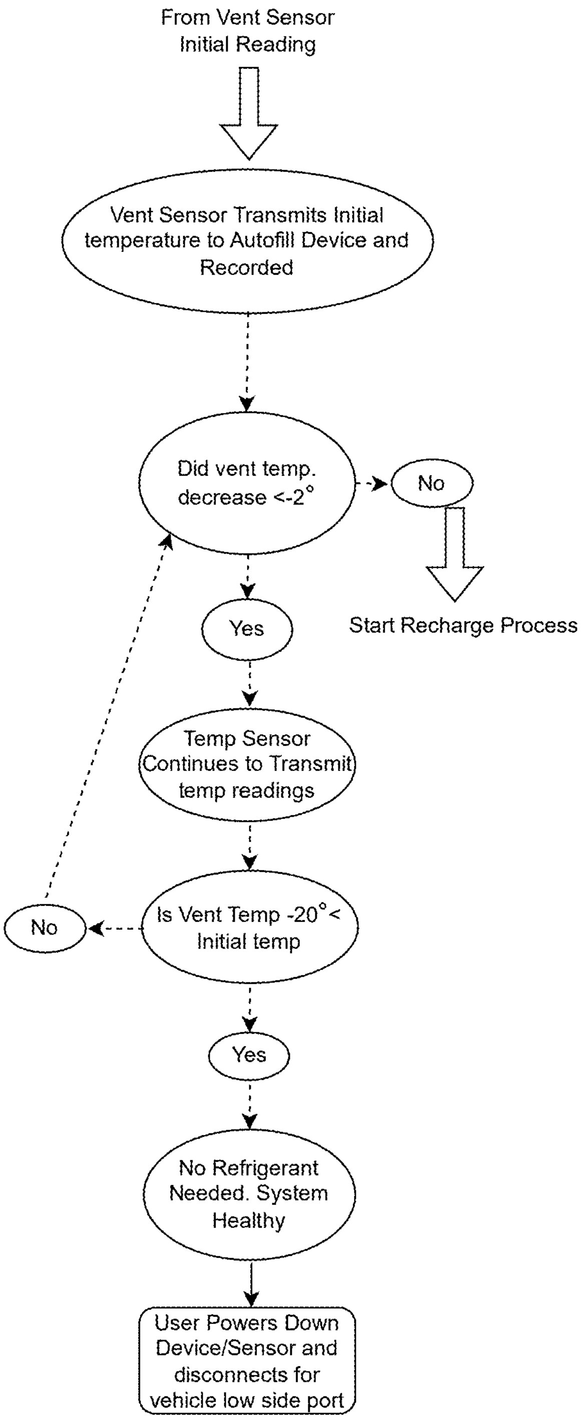

As FIG. 6B depicts, even with low refrigerant, temperature reductions from initial vent temperature or a negative $\Delta T$ can be expected. If vent temperature decreases and shows a negative $\Delta T$ of $-2°$ F. or more in the initialization phase prior to recharge while the VCU and valve are closed (616), the Autofill device will continue to measure vent sensor information received and log $\Delta T$ and $\Delta T$ derivatives. If vent temperature continues to drop and reaches a predetermined threshold from initial reading (618), the Autofill device will never initialize recharge and indicate to user that the system is not in need of refrigerant thereby preventing excess refrigerant charge into an otherwise health system.

Figure 6C:
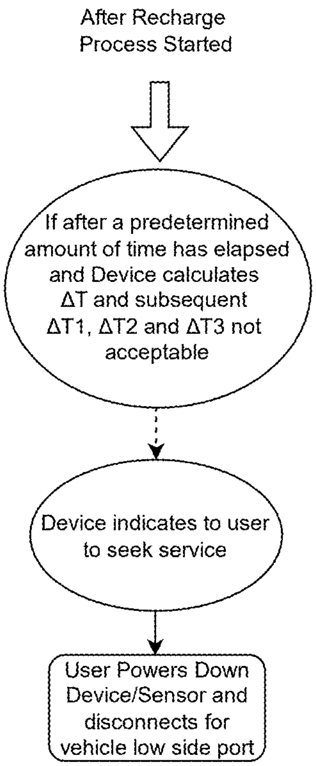

As noted earlier, upon initiation of device prior to introduction of refrigerant to the system occurs, temperature reductions measured at the output vent of the A/C system can be expected. If the change in temperature or $\Delta T$ stops before reaching a predetermined threshold, the Autofill device will direct the user to start charge thereby opening the valve. Once the refrigerant valve is open and refrigerant is introduced into the system, the previous temperature reading when compared to the sampled temperature at the current time interval should indicate a decrease in temperature at the output vent. A decrease in temperature is indicated by a lower sampled temperature ($\Delta T<0$) in the current time interval than previously measured. Thus, if temperature change$=T_1-T\geq 0°$ C., the temperature at the output vent has increased relative to the prior time period indicating a failure to cause additional cooling by the A/C system from increased refrigerant, thereby indicating a potential fault in the A/C system. Such faults may include an "open system" indicating a potential leak. After an initial and or subsequent recharging has commenced, the newly introduced refrigerant should result in additional cooling by the system. As shown in FIG. 6C, when the Autofill device detects lack of cooling from the information received from the vent sensor resulting from the recharge process (620), the device will instruct the device or smartphone app will automatically stop fill and indicate to user to seek service (622).

Continuing in FIG. 6A, the Autofill device will receive vent sensor temperature data readings, automatically stop recharge (624) to analyze and log changes in temperature at set time intervals, restart recharge for a set time interval and automatically stop recharge to analyze and log changes thereby creating ΔT and subsequent ΔT readings. In one embodiment, the device or smartphone app will determine ΔT (most current change), ΔT1 (previous change), ΔT2, ($2^{nd}$ previous change) and ΔT3 ($3^{rd}$ previous change) and log this data until a predetermined threshold is met (626). It is noted that analyzing a singular change in temperature may be inaccurate as fluctuations and variations are expected. Thus, it is helpful to analyze a sequence of ΔT readings to better gauge the macro cooling output of the system. The device of smartphone will analyze ΔT against two or more sequential prior readings determining the effect of the introduction of more refrigerant into the A/C system. In some embodiments, cooling may be determined by an elapsed time in combination with the sampled temperature and the rate of change in temperature at a time interval or range of time intervals detecting a slowing of cooling at an output vent.

Figure 7:
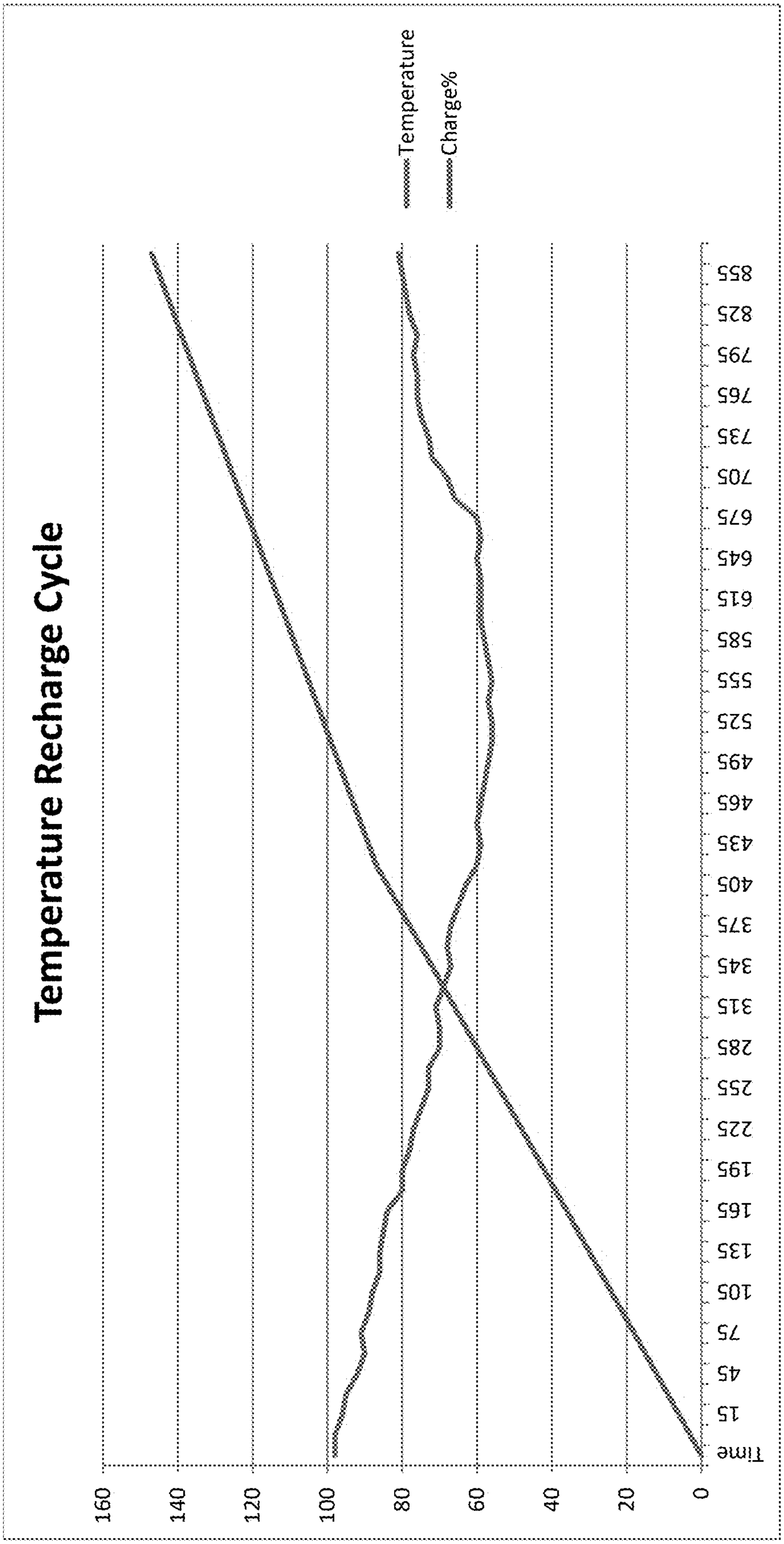
FIG. 7 is graph depicting an example of temperature cooling during recharging, according to one embodiment of the air conditioning autofill overfill protection temperature sensing air conditioning refrigerant recharge device.

FIG. 7 is graph depicting an example of temperature cooling during recharging over an elapsed time for a typical vehicle recharge process, according to one embodiment of the air conditioning autofill overfill protection temperature sensing air conditioning refrigerant recharge device. In the example given, the initial temperature us 98° F. in the initial phase depicted in FIG. 6A (628). As refrigerant is introduced into the A/C system, the vent, temperature data is sent in predetermine time intervals with the device automatically stopping recharge to read current temperature (624). As evidenced in the figure, as the system gains enough refrigerant to provide enough differential pressure between the high pressure side and low pressure side, the vent temperature drops show a negative ΔT. As the A/C system approaches optimal refrigerant levels, the ΔT between readings slows with each ΔT closer to 0 change. Once system is recharged, the ΔT readings along with previous ΔT readings indicate a plateau effect FIG. 7 (632) with minimal temperature change as determined by the Autofill device (626). If the system becomes over-charged, an increase of vent temperature occurs showing a ΔT>0. If overcharge occurs, there is too much refrigerant in the system and the low side pressure becomes too high resulting in not enough pressure differential between low pressure and high pressure sides of the A/C system.

FIG. 8A is table of inputs, outputs, ΔT values, logic states and actions of an example of temperature cooling during recharging, according to one embodiment of the air conditioning autofill overfill protection temperature sensing air conditioning refrigerant recharge device. As the recharge process starts and refrigerant is introduced into the A/C system FIG. 6A (628), the ΔT values show resulting cooling of the system. They autofill device will automatically stop charge and instruct the VCU to close the valve at predetermined time intervals to analyze the information received by the vent sensor (626). As cooling is achieved, the process continues and the user is instructed to continue recharge after each analysis of ΔT values. As mentioned earlier, analyzing a singular change in temperature may be inaccurate as fluctuations and variations are expected. The Autofill device will analyze a sequence of ΔT readings as depicted as ΔT, ΔT1, ΔT2 and ΔT3 to better gauge the macro cooling output of the system. As shown on line 210 in the representation of time elapsed in seconds, after 210 seconds of charge, the changes in temperature are shown as ΔT<0 or ΔT1<−2 or ΔT2<−2 or ΔT3<−2. In this example, each change in temperature over an elapsed time represented by ΔT shows temperature drop of more than 2 degrees indicating continued or increasing cooling capacity. Once sufficient refrigerant has been introduced into the system, the cooling capacity slows as represented in line 570 in elapsed seconds with T values equaling ΔT≥0 and ΔT1≥−2 and ΔT≥−2 and ΔT≥−2. As the system becomes fully charged, the ΔT values show no change or greater than −2 degrees change showing the plateau effect in FIG. 7 (632). Alternatively, other means of analysis of ΔT, e.g. average temperature drop, may be substituted in determining logic states and actions without departing from the scope or operation of the invention as described herein.

FIG. 8B is table of inputs, outputs, ΔT values, logic states and actions of an example of temperature cooling during recharging when a system is healthy and not need of additional refrigerant. As shown in FIG. 6B, when initial temperatures are received by the Autofill device from the vent sensor (628) and prior to commencement of the recharge process, the device will calculate the initial drop in temperature and determine if it sees a decrease of 2 degrees or more (614). If the device sees this drop, it will continue to calculate the ΔT until it reaches a local minimum (634) indicating a healthy system not in need of recharge thereby preventing users from introducing refrigerant where it is not needed.

FIG. 8C is table of inputs, outputs, ΔT values, logic states and actions of an example of temperature cooling during recharging when a system fault is detected part way through the filling operation such as an open system or large leak in the A/C system. As shown in FIG. 6C, after the recharge process has started and refrigerant has been introduced into the system, the device will calculate ΔT and subsequent ΔT from information received from the vent sensor (620) and no cooling effect has been achieved or a reversal of cooling is witnessed, the device will indicate to user to seek service (622), thereby preventing users from introducing refrigerant where it is not needed.

The present disclosure provides, generally, computer and logic circuit-controlled devices configured to implement the methods and systems described above. Such devices may include central processing units (CPU) (e.g., processors) which may include or be in communication with memory (e.g., random-access memory, read-only memory, flash memory), electronic storage units (e.g., static RAM, memory stick, SDRAM modules), communication interfaces (e.g., network adapters, wireless adapters) for communicating with one or more other systems, and peripheral devices, such as cache, other memory, data storage and/or electronic display adapters, include touch-sensitive graphical display devices. Memory, storage units, interfaces, and peripheral devices are known to be communication with the CPU processors through communication buses, which may be a motherboard or a backplane of a computing or controller device. Computer or controller devices may be operatively coupled to a computer network (e.g. the internet) by one or more communications interfaces.

Computer processes implementing the control logic of the present invention may execute a sequence of machine-readable instructions, which can be embodied in a program or software. The instructions may be stored in a memory location. The instructions can be directed to the processor, which can subsequently program or otherwise configure the processor to implement methods of the present disclosure. Processors may be part of a circuit, such as an integrated circuit and one or more other components or modules of the computer systems may be included in a circuit, for example, in some cases, the circuits may be an application specific integrated circuit (ASIC).

Memory storage may store files, such as drivers, libraries and saved programs. Storage units may store user data, e.g., user preferences and user programs. Methods as described herein may be implemented by way of machine (e.g., CPU, processor) executable code stored on an electronic storage location of the computer or controller device. Machine executable or machine-readable code may be provided in the form of software. During use, the code may be executed by the processor, retrieved from the storage unit and stored on the memory for ready access by the processor. In some situations, machine-executable instructions may be stored directly to memory. Computer codes may be pre-compiled and configured for use with a machine have a processer adapted to execute the code or can be compiled during runtime. The code can be supplied in a programming language that can be selected to enable the code to execute in a pre-compiled or as compiled fashion.

As described herein, various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable updating of the software, for example, from a management server or host computer into the computer platform of an application server.

As used herein, unless restricted to non-transitory, tangible "storage" media, terms such as computer or machine "readable medium" refer to any medium that participates in providing instructions to a processor for execution. Machine readable medium may take many forms, including but not limited to, a tangible storage medium, a carrier wave medium or physical transmission medium. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system can include or be in communication with an electronic display that comprises a user interface (UI) or a graphical user interface (GUI) for providing, for example, user interfaces associated with the system. Methods and systems of the present disclosure can be implemented by way of one or more algorithms. An algorithm can be implemented by way of software upon execution by a CPU/processor.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions may occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention.

It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for servicing an air-conditioning system of a vehicle, the method comprising:

initiating refrigerant filling into the air-conditioning system;

after initiating the refrigerant filling, tracking a variation, wherein the variation is a variation in a rate-of-change of the output temperature of the air-conditioning system measured by a temperature sensor within the vehicle;

processing the variation to determine a stopping time for the refrigerant filling; and ceasing refrigerant filling at the stopping time, wherein processing the variation in the rate-of-change of the output temperature includes: detecting a first state transition from a first state to a second state when the rate-of-change is first lower than a threshold value and detecting a second state transition from the second state to a third state when the rate-of-change in the second state is first greater than the threshold value; wherein the stopping time is determined from a time of the second state transition.

2. The method of claim 1, wherein processing the variation includes: detecting a negative rate-of-change at a first time, and determining the stopping time to be a second time after the first time when the rate-of-change is equal to a threshold value and the rate-of-change at times between the first time and the second time is lower than said threshold value.

3. The method of claim 1, wherein processing the variation includes: detecting that the rate-of-change has reached a minimum at a first time and continuing to charge between said first time and a second time that follows said first time by a threshold interval.

4. The method of claim 3, further comprising selecting said threshold interval to be thirty seconds.

5. The method of claim 1, wherein tracking variation in the rate-of-change of the output temperature of the air-conditioning system measured by a temperature sensor comprises making measurements of plural temperatures at an output of the air-conditioning system of the vehicle, said measurements being separated by an interval, and wherein tracking said variation further comprises processing said plural measurements and said interval to determine a rate-of-change.

6. The method of claim 1, wherein tracking variation in the rate-of-change of the output temperature of the air-conditioning system measured by a temperature sensor includes determining when the derivative of the change in temperature with respect to time (AAT) is substantially zero.

7. The method of claim 1, wherein tracking variation in the rate-of-change of the output temperature of the air-conditioning system includes determining when the derivative of the change in temperature with respect to time has reached a local minimum.

8. The method of claim 1, wherein tracking variation in the rate-of-change of the output temperature of the air-conditioning system includes determining when the derivative of the change in temperature has an average value of zero.

9. The method of claim 1, wherein tracking variation in the rate-of-change of the output temperature of the air-conditioning system includes determining when the derivative of the change in temperature has an average value of zero during an interval between measurements of said temperature.

10. The method of claim 1, wherein ceasing refrigerant filling at the stopping time comprises automatically ceasing refrigerant filling.

11. The method of claim 1, wherein, after ceasing refrigerant filling at the stopping time, preventing further charging with said refrigerant.

12. The method of claim 1, wherein, after ceasing refrigerant filling at the stopping time, using a solenoid to suppress further charging.

13. The method of claim 1, wherein tracking said variation comprises directing cooled air from an air-conditioning vent of said vehicle to a sensor while said refrigerant filling is taking place, wherein directing said cooled air comprises passing said cooled air through a conduit having a first end and a second end, wherein said first end is configured to couple to said air-conditioning vent, and wherein said conduit is sufficiently flexible to enable said second end to be visible from outside said vehicle.

14. The method of claim 13, wherein passing said cooled air through said conduit comprises passing said cooled air through a pliable conduit.

15. The method of claim 13, wherein passing said cooled air through said conduit comprises passing said cooled air through a conduit that comprises pivoting segments.

16. A method for servicing an air-conditioning system of a vehicle, the method comprising:

initiating refrigerant filling into the air-conditioning system; after initiating the refrigerant filling, tracking a variation, wherein the variation is a variation in a rate-of-change of the output temperature of the air-conditioning system measured by a temperature sensor within the vehicle; processing the variation to determine a stopping time for the refrigerant filling; and ceasing refrigerant filling at the stopping time, wherein processing the variation in the rate-of-change of the output temperature includes: detecting a first state transition from a first state to a second state when the rate-of-change is first lower than a threshold value; and detecting a second state transition from the second state to a third state when the rate-of-change in the second state is first equal to the threshold value; wherein the stopping time is determined from a time of the second state transition.

* * * * *